(12) United States Patent
Clarberg et al.

(10) Patent No.: US 10,818,054 B2
(45) Date of Patent: Oct. 27, 2020

(54) APPARATUS AND METHOD FOR ASYNCHRONOUS TEXEL SHADING

(71) Applicant: Intel Corporation, Santa Clara, CA (US)

(72) Inventors: Franz Petrik Clarberg, Lund (SE); Tomasz Janczak, Gdansk (PL); Carl Jacob Munkberg, Malmö (SE); Izajasz P. Wrosz, Banino (PL)

(73) Assignee: Intel Corporation, Santa Clara, CA (US)

( * ) Notice: Subject to any disclaimer, the term of this patent is extended or adjusted under 35 U.S.C. 154(b) by 73 days.

(21) Appl. No.: 16/080,298

(22) PCT Filed: Apr. 1, 2016

(86) PCT No.: PCT/PL2016/000037
§ 371 (c)(1),
(2) Date: Aug. 27, 2018

(87) PCT Pub. No.: WO2017/171568
PCT Pub. Date: Oct. 5, 2017

(65) Prior Publication Data
US 2019/0087992 A1  Mar. 21, 2019

(51) Int. Cl.
*G06T 11/40* (2006.01)
*G06T 11/00* (2006.01)
(Continued)

(52) U.S. Cl.
CPC .......... *G06T 11/40* (2013.01); *G06T 11/001* (2013.01); *G06T 15/005* (2013.01); *G06T 15/04* (2013.01)

(58) Field of Classification Search
CPC ..................................................... G06T 11/40
(Continued)

(56) References Cited

U.S. PATENT DOCUMENTS 10,074,213 B2    9/2018  Clarberg et al.
2015/0091931 A1*  4/2015  Pelton .................. G06T 11/001
                                                        345/582

(Continued)

FOREIGN PATENT DOCUMENTS

EP            2849154 B1      9/2017

OTHER PUBLICATIONS

PCT Notification of Transmittal of the International Search Report and the Written Opinion of the International Searching Authority, or the Declaration from PCT/CN2014/091834, (dated Dec. 22, 2016, 14 pages.

(Continued)

*Primary Examiner* — Shivang I Patel
(74) *Attorney, Agent, or Firm* — Nicholson De Vos Webster & Elliott LLP

(57) ABSTRACT

An apparatus and method are described for asynchronous texel shading. For example, one embodiment of a graphics processing apparatus comprises: a first shader to perform shading operations on a plurality of pixels in a first pass and to submit a request to shade texels; and a texel shader to responsively perform texel shading operations in response to the request from the first shader, the texel shader to write results to a procedural texture stored in a memory subsystem, the procedural texture to be read during a second pass by the first shader or another shader.

19 Claims, 21 Drawing Sheets

(51) Int. Cl.
  *G06T 15/04* (2011.01)
  *G06T 15/00* (2011.01)
(58) Field of Classification Search
  USPC .......................................................... 345/589
  See application file for complete search history.

(56) References Cited

U.S. PATENT DOCUMENTS

2015/0027905 A1    10/2015  Kaburlasos
2016/0078586 A1*   3/2016   Akenine-Moller ....... G06T 9/00
                                                     345/555

OTHER PUBLICATIONS

Kwon Kwontaek, et al., "Mobile GPU shader processor based on non-blocking Coarse Grained Reconfigurable Arrays architecture" 2013 International Conference On Field-Programmable Technology (FPT), IEEE, Dec. 9, 2013, pp. 198-205, XP032554989, DOI: 10.1109/FPT.2013.6718353 [retrieved on Jan. 21, 2014].

Joshua Barczak: "Thoughts on Texels Shaders, The Burning Basis Vector" Blog, Oct. 28, 2015, pp. 1-25, XP055327284, Retrieved from the Internet: URL:http://web.archive.org/web/20151102051408/http://www.joshbarczak.com/blog/?p=848 [retrieved on Dec. 8, 2016].

Joshua Barczak:"Texel Shader Discussion" The Burning Basis Vector—Uncivilized Computer Graphics Musings, Oct. 29, 2015, pp. 1-9, XP055326175, Retrieved from the Internet: URL:http://web.archive.org/web/20160310095 17http://www.hoshbarczak.com/blog/?p=955 [retrieved on Dec. 6, 2016].

International Preliminary Report on Patentability for Application No. PCT/PL2016/000037 dated Oct. 11, 2018, 7 pages.

Clarberg, Petrik, et al., "AMFS: Adaptive Multi-Frequency Shading for Future Graphics Processors", ACM on Graphics (Proceedings of SIGGRAPH 2014), vol. 33, No. 4, Aug. 2014, 12 pages.

* cited by examiner

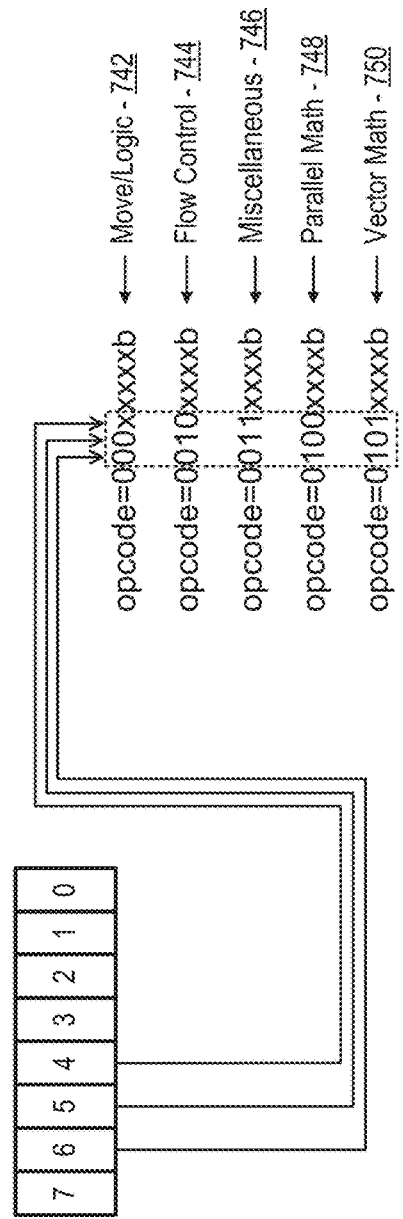
FIG. 7

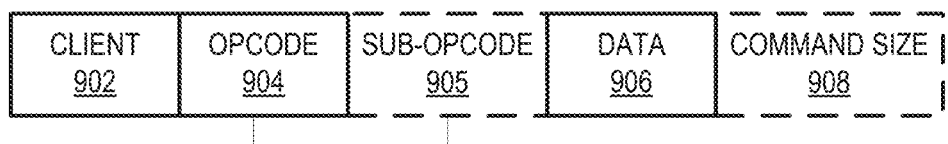
FIG. 9A  GRAPHICS PROCESSOR COMMAND FORMAT
900
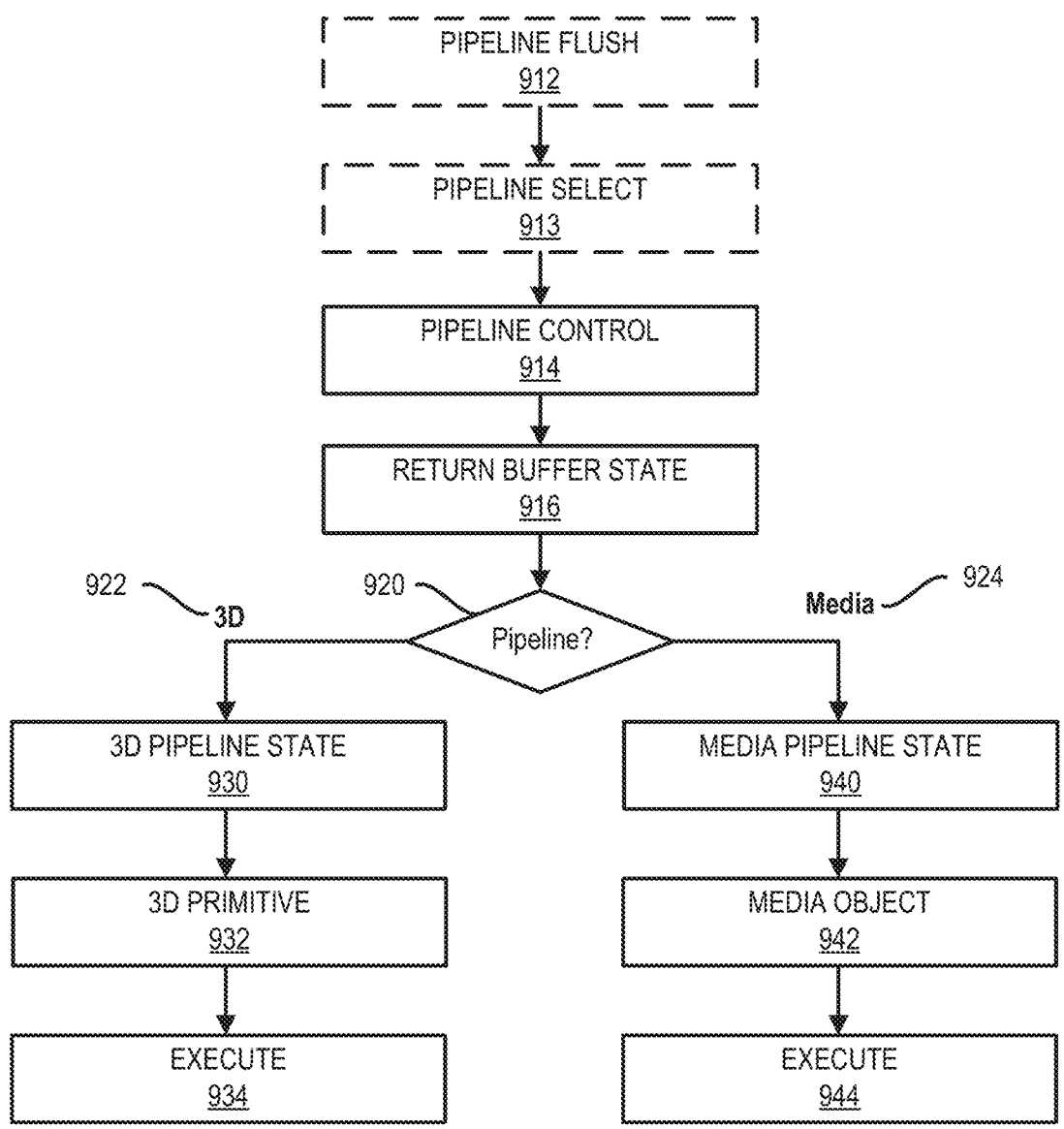
FIG. 9B  GRAPHICS PROCESSOR COMMAND SEQUENCE
910

APPARATUS AND METHOD FOR ASYNCHRONOUS TEXEL SHADING

CROSS-REFERENCE TO RELATED APPLICATION

This patent application is a U.S. National Phase Application under 35 U.S.C. § 371 of International Application No. PCT/PL2016/000037, filed Apr. 1, 2016, entitled APPARATUS AND METHOD FOR ASYNCHRONOUS TEXEL SHADING.

BACKGROUND

Field of the Invention

This invention relates generally to the field of computer processors. More particularly, the invention relates to an apparatus and method for asynchronous texel shading.

Description of the Related Art

A procedural texture is a computer-generated image created using an algorithm which renders a realistic representation of a material, for example depicting natural elements (e.g., wood, marble, granite, metal, stone, etc). Procedural textures is a generalization of traditional memory-based textures to allow a Texel Shader (TS) to generate texels. The contents of a Procedural Texture (PT) are initially cleared, and the texel shader is lazily evaluated in texture space (rather than screen space) to compute the values of texels that have not already been computed. This allows applications to implement advanced variable-rate shading, including shading reuse between primitives, draw calls, viewports, and frames. The prime use cases are rendering for high-resolution displays and virtual reality (VR) or augmented reality (AR) applications, where a large number of pixels and/or high frame rates results in a heavy burden on the graphics processor unit (GPU) in terms of arithmetic cost, power, and bandwidth usage.

Texel shading has been previously described with a 1-pass model where the texel shader runs synchronously—i.e., the issuing thread waits for the texel shader to finish and return a shaded result. This is a problem since modern GPUs are massively parallel (e.g., potentially running thousands of threads) and there is often a many-to-one mapping of pixel shader threads to texel shader threads, e.g., the texel shader is running at lower spatial frequency. To hide the latency of the texel shader, a large number of pixel shader threads have to be stalled, consuming valuable on-chip registers and/or buffer space, or alternatively triggering expensive spill/fill operations to swap out the thread contexts for stalled threads to memory.

BRIEF DESCRIPTION OF THE DRAWINGS

A better understanding of the present invention can be obtained from the following detailed description in conjunction with the following drawings, in which:

FIG. 7 illustrates a graphics processor execution unit instruction format according to an embodiment;

FIG. 9A is a block diagram illustrating a graphics processor command format according to an embodiment;

FIG. 9B is a block diagram illustrating a graphics processor command sequence according to an embodiment;

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Graphics Processor Architectures and Data Types

System Overview

Figure 1:
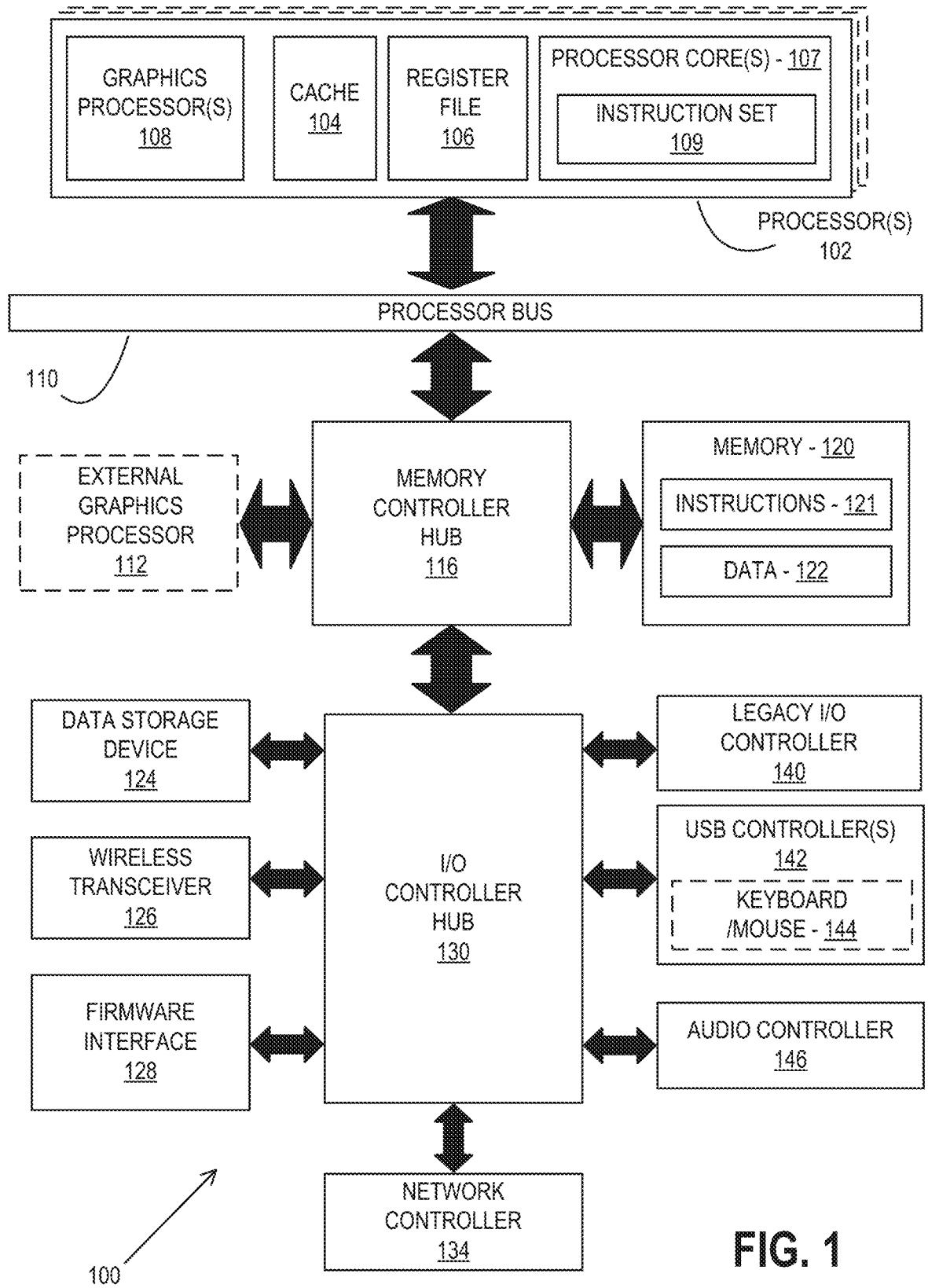
FIG. 1 is a block diagram of an embodiment of a computer system with a processor having one or more processor cores and graphics processors.

FIG. 1 is a block diagram of a processing system 100, according to an embodiment. In various embodiments the system 100 includes one or more processors 102 and one or more graphics processors 108, and may be a single processor desktop system, a multiprocessor workstation system, or a server system having a large number of processors 102 or processor cores 107. In on embodiment, the system 100 is a processing platform incorporated within a system-on-a-chip (SoC) integrated circuit for use in mobile, handheld, or embedded devices.

An embodiment of system 100 can include, or be incorporated within a server-based gaming platform, a game console, including a game and media console, a mobile gaming console, a handheld game console, or an online game console. In some embodiments system 100 is a mobile phone, smart phone, tablet computing device or mobile Internet device. Data processing system 100 can also include, couple with, or be integrated within a wearable device, such as a smart watch wearable device, smart eyewear device, augmented reality device, or virtual reality device. In some embodiments, data processing system 100 is a television or set top box device having one or more processors 102 and a graphical interface generated by one or more graphics processors 108.

In some embodiments, the one or more processors 102 each include one or more processor cores 107 to process instructions which, when executed, perform operations for system and user software. In some embodiments, each of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 107 may also include other processing devices, such a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of the processor 102.

In some embodiments, processor 102 is coupled to a processor bus 110 to transmit communication signals such as address, data, or control signals between processor 102 and other components in system 100. In one embodiment the system 100 uses an exemplary 'hub' system architecture, including a memory controller hub 116 and an Input Output (I/O) controller hub 130. A memory controller hub 116 facilitates communication between a memory device and other components of system 100, while an I/O Controller Hub (ICH) 130 provides connections to I/O devices via a local I/O bus. In one embodiment, the logic of the memory controller hub 116 is integrated within the processor.

Memory device 120 can be a dynamic random access memory (DRAM) device, a static random access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller hub 116 also couples with an optional external graphics processor 112, which may communicate with the one or more graphics processors 108 in processors 102 to perform graphics and media operations.

In some embodiments, ICH 130 enables peripherals to connect to memory device 120 and processor 102 via a high-speed I/O bus. The I/O peripherals include, but are not limited to, an audio controller 146, a firmware interface 128, a wireless transceiver 126 (e.g., Wi-Fi, Bluetooth), a data storage device 124 (e.g., hard disk drive, flash memory, etc.), and a legacy I/O controller 140 for coupling legacy (e.g., Personal System 2 (PS/2)) devices to the system. One or more Universal Serial Bus (USB) controllers 142 connect input devices, such as keyboard and mouse 144 combinations. A network controller 134 may also couple to ICH 130. In some embodiments, a high-performance network controller (not shown) couples to processor bus 110. It will be appreciated that the system 100 shown is exemplary and not limiting, as other types of data processing systems that are differently configured may also be used. For example, the I/O controller hub 130 may be integrated within the one or more processor 102, or the memory controller hub 116 and I/O controller hub 130 may be integrated into a discreet external graphics processor, such as the external graphics processor 112.

Figure 2:
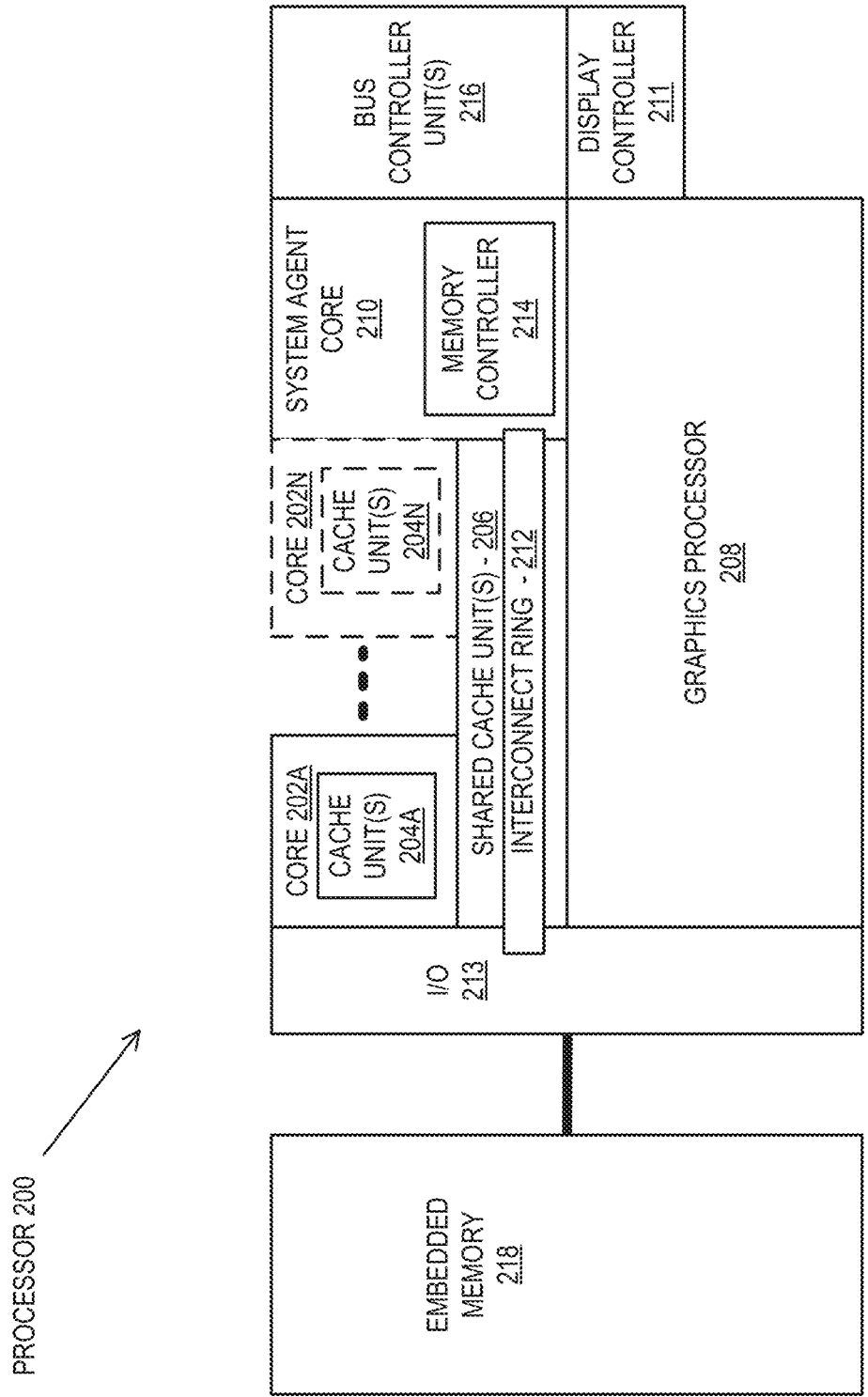
FIG. 2 is a block diagram of one embodiment of a processor having one or more processor cores, an integrated memory controller, and an integrated graphics processor.

FIG. 2 is a block diagram of an embodiment of a processor 200 having one or more processor cores 202A-202N, an integrated memory controller 214, and an integrated graphics processor 208. Those elements of FIG. 2 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206.

The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more Peripheral Component Interconnect buses (e.g., PCI, PCI Express). System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, a display controller 211 is coupled with the graphics processor 208 to drive graphics processor output to one or more coupled displays. In some embodiments, display controller 211 may be a separate module coupled with the graphics processor via at least one interconnect, or may be integrated within the graphics processor 208 or system agent core 210.

In some embodiments, a ring based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202-202N and graphics processor 208 use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-N execute a first instruction set, while at least one of the other cores executes a subset of the first instruction set or a different instruction set. In one embodiment processor cores 202A-202N are heterogeneous in terms of microarchitecture, where one or more cores having a relatively higher power consumption couple with one or more power cores having a lower power consumption. Additionally, processor 200 can be implemented on one or more chips or as an SoC integrated circuit having the illustrated components, in addition to other components.

Figure 3:
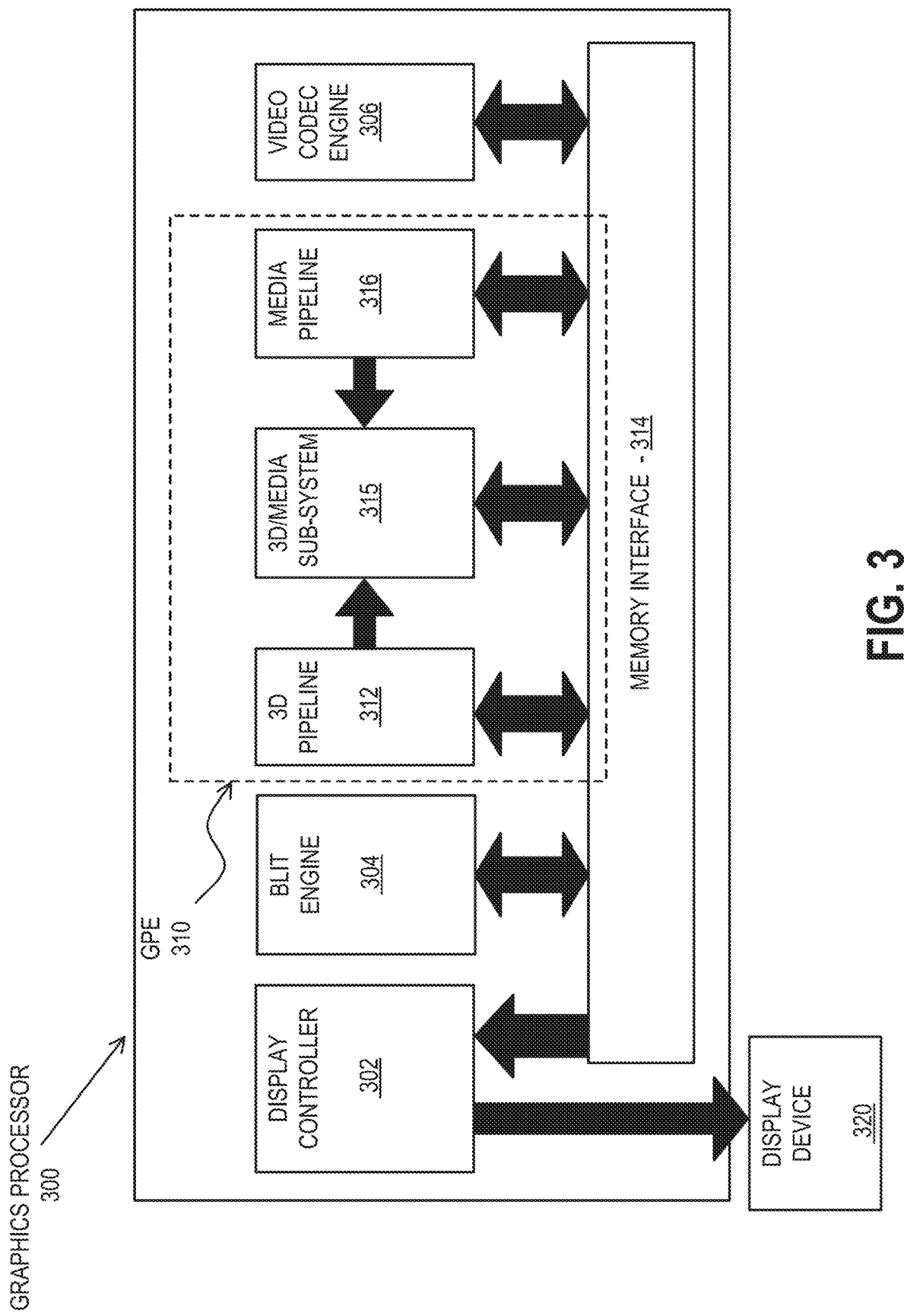
FIG. 3 is a block diagram of one embodiment of a graphics processor which may be a discreet graphics processing unit, or may be graphics processor integrated with a plurality of processing cores.

FIG. 3 is a block diagram of a graphics processor 300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 320. Display controller 302 includes hardware for one or more overlay planes for the display and composition of multiple layers of video or user interface elements. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, graphics processing engine 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media subsystem 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

3D/Media Processing

Figure 4:
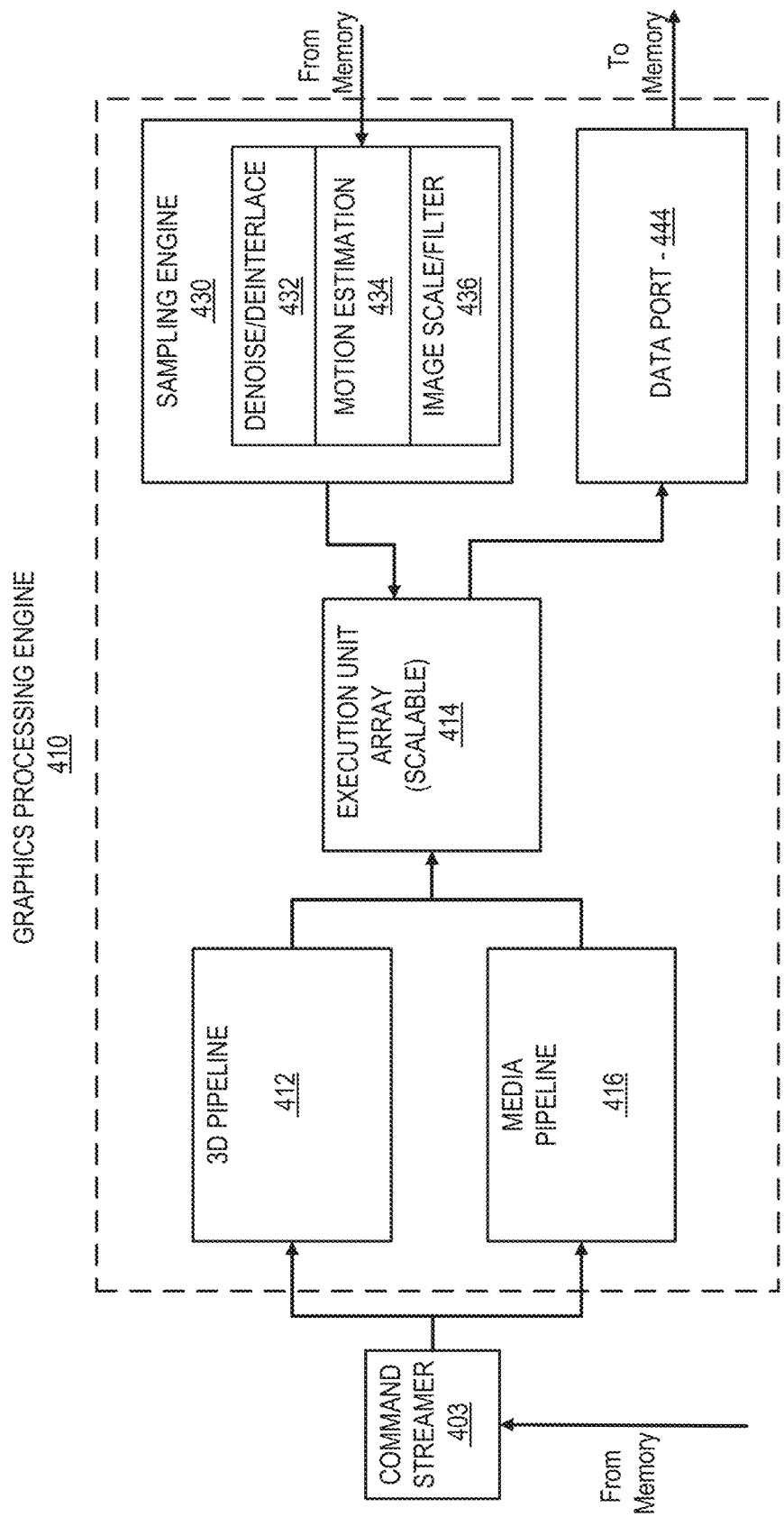
FIG. 4 is a block diagram of an embodiment of a graphics-processing engine for a graphics processor.

FIG. 4 is a block diagram of a graphics processing engine 410 of a graphics processor in accordance with some embodiments. In one embodiment, the GPE 410 is a version of the GPE 310 shown in FIG. 3. Elements of FIG. 4 having the same reference numbers (or names) as the elements of any other figure herein can operate or function in any manner similar to that described elsewhere herein, but are not limited to such.

In some embodiments, GPE 410 couples with a command streamer 403, which provides a command stream to the GPE 3D and media pipelines 412, 416. In some embodiments, command streamer 403 is coupled to memory, which can be system memory, or one or more of internal cache memory and shared cache memory. In some embodiments, command streamer 403 receives commands from the memory and sends the commands to 3D pipeline 412 and/or media pipeline 416. The commands are directives fetched from a ring buffer, which stores commands for the 3D and media pipelines 412, 416. In one embodiment, the ring buffer can additionally include batch command buffers storing batches of multiple commands. The 3D and media pipelines 412, 416 process the commands by performing operations via logic within the respective pipelines or by dispatching one or more execution threads to an execution unit array 414. In some embodiments, execution unit array 414 is scalable, such that the array includes a variable number of execution units based on the target power and performance level of GPE 410.

In some embodiments, a sampling engine 430 couples with memory (e.g., cache memory or system memory) and execution unit array 414. In some embodiments, sampling engine 430 provides a memory access mechanism for execution unit array 414 that allows execution array 414 to read graphics and media data from memory. In some embodiments, sampling engine 430 includes logic to perform specialized image sampling operations for media.

In some embodiments, the specialized media sampling logic in sampling engine 430 includes a de-noise/de-interlace module 432, a motion estimation module 434, and an image scaling and filtering module 436. In some embodiments, de-noise/de-interlace module 432 includes logic to perform one or more of a de-noise or a de-interlace algorithm on decoded video data. The de-interlace logic combines alternating fields of interlaced video content into a single fame of video. The de-noise logic reduces or removes data noise from video and image data. In some embodiments, the de-noise logic and de-interlace logic are motion adaptive and use spatial or temporal filtering based on the amount of motion detected in the video data. In some embodiments, the de-noise/de-interlace module 432 includes dedicated motion detection logic (e.g., within the motion estimation engine 434).

In some embodiments, motion estimation engine 434 provides hardware acceleration for video operations by performing video acceleration functions such as motion vector estimation and prediction on video data. The motion estimation engine determines motion vectors that describe the transformation of image data between successive video frames. In some embodiments, a graphics processor media codec uses video motion estimation engine 434 to perform operations on video at the macro-block level that may otherwise be too computationally intensive to perform with a general-purpose processor. In some embodiments, motion estimation engine 434 is generally available to graphics processor components to assist with video decode and processing functions that are sensitive or adaptive to the direction or magnitude of the motion within video data.

In some embodiments, image scaling and filtering module 436 performs image-processing operations to enhance the visual quality of generated images and video. In some embodiments, scaling and filtering module 436 processes image and video data during the sampling operation before providing the data to execution unit array 414.

In some embodiments, the GRE 410 includes a data port 444, which provides an additional mechanism for graphics subsystems to access memory. In some embodiments, data port 444 facilitates memory access for operations including render target writes, constant buffer reads, scratch memory space reads/writes, and media surface accesses. In some embodiments, data port 444 includes cache memory space to cache accesses to memory. The cache memory can be a single data cache or separated into multiple caches for the multiple subsystems that access memory via the data port (e.g., a render buffer cache, a constant buffer cache, etc.). In some embodiments, threads executing on an execution unit in execution unit array 414 communicate with the data port by exchanging messages via a data distribution interconnect that couples each of the sub-systems of GRE 410.

Execution Units

Figure 5:
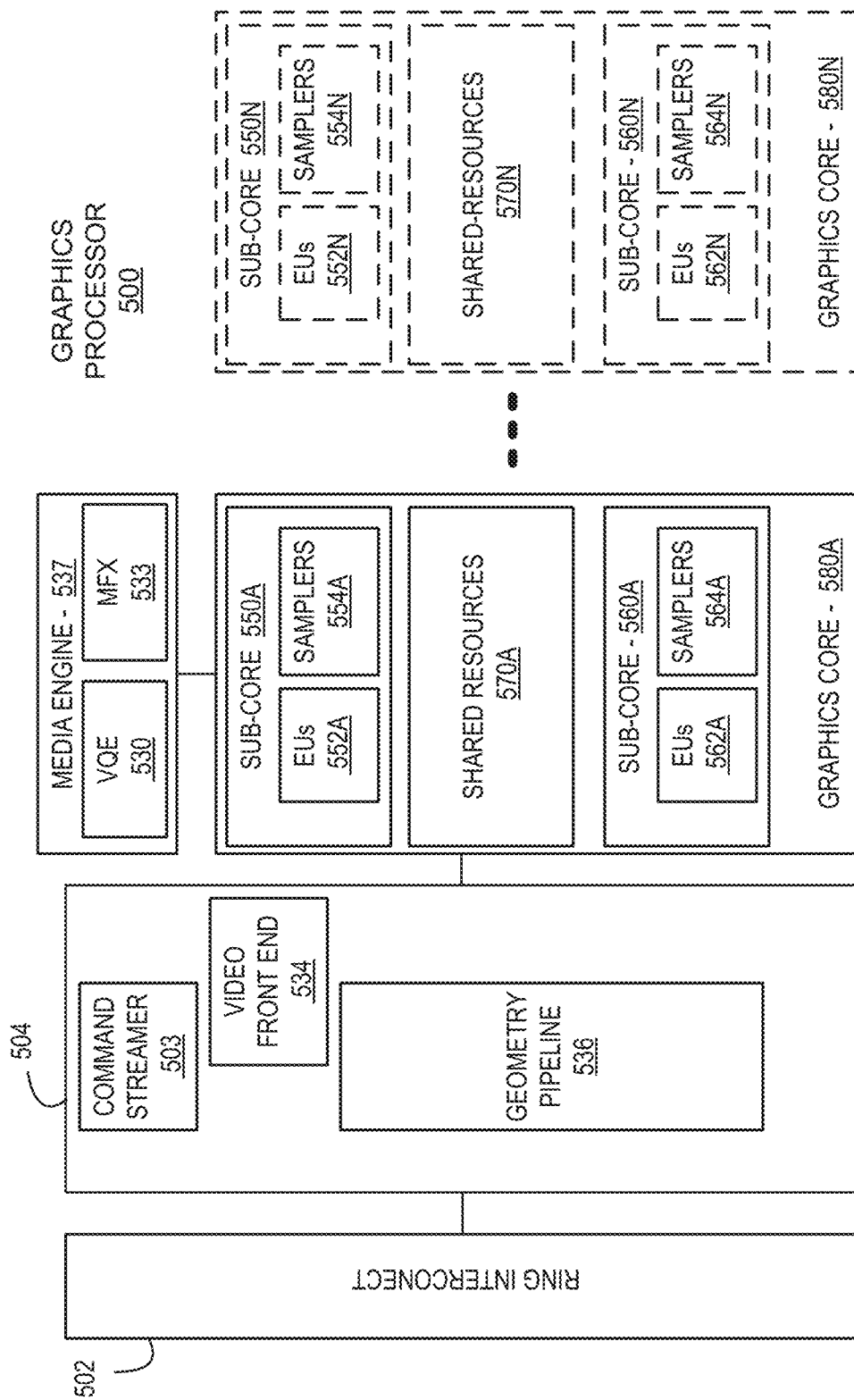
FIG. 5 is a block diagram of another embodiment of a graphics processor.

FIG. 5 is a block diagram of another embodiment of a graphics processor 500. Elements of FIG. 5 having the same reference numbers (or names) as the elements of any other figure herein can operate or function in any manner similar to that described elsewhere herein, but are not limited to such.

In some embodiments, graphics processor 500 includes a ring interconnect 502, a pipeline front-end 504, a media engine 537, and graphics cores 580A-580N. In some embodiments, ring interconnect 502 couples the graphics processor to other processing units, including other graphics processors or one or more general-purpose processor cores. In some embodiments, the graphics processor is one of many processors integrated within a multi-core processing system.

In some embodiments, graphics processor 500 receives batches of commands via ring interconnect 502. The incoming commands are interpreted by a command streamer 503 in the pipeline front-end 504. In some embodiments, graphics processor 500 includes scalable execution logic to perform 3D geometry processing and media processing via the graphics core(s) 580A-580N. For 3D geometry processing commands, command streamer 503 supplies commands to geometry pipeline 536. For at least some media processing commands, command streamer 503 supplies the commands to a video front end 534, which couples with a media engine 537. In some embodiments, media engine 537 includes a Video Quality Engine (VQE) 530 for video and image post-processing and a multi-format encode/decode (MFX) 533 engine to provide hardware-accelerated media data encode and decode. In some embodiments, geometry pipeline 536 and media engine 537 each generate execution threads for the thread execution resources provided by at least one graphics core 580A.

In some embodiments, graphics processor 500 includes scalable thread execution resources featuring modular cores 580A-580N (sometimes referred to as core slices), each having multiple sub-cores 550A-550N, 560A-560N (sometimes referred to as core sub-slices). In some embodiments, graphics processor 500 can have any number of graphics cores 580A through 580N. In some embodiments, graphics processor 500 includes a graphics core 580A having at least a first sub-core 550A and a second core sub-core 560A. In other embodiments, the graphics processor is a low power processor with a single sub-core (e.g., 550A). In some embodiments, graphics processor 500 includes multiple graphics cores 580A-580N, each including a set of first sub-cores 550A-550N and a set of second sub-cores 560A-560N. Each sub-core in the set of first sub-cores 550A-550N includes at least a first set of execution units 552A-552N and media/texture samplers 554A-554N. Each sub-core in the set of second sub-cores 560A-560N includes at least a second set of execution units 562A-562N and samplers 564A-564N. In some embodiments, each sub-core 550A-550N, 560A-560N shares a set of shared resources 570A-570N. In some embodiments, the shared resources include shared cache memory and pixel operation logic. Other shared resources may also be included in the various embodiments of the graphics processor.

Figure 6:
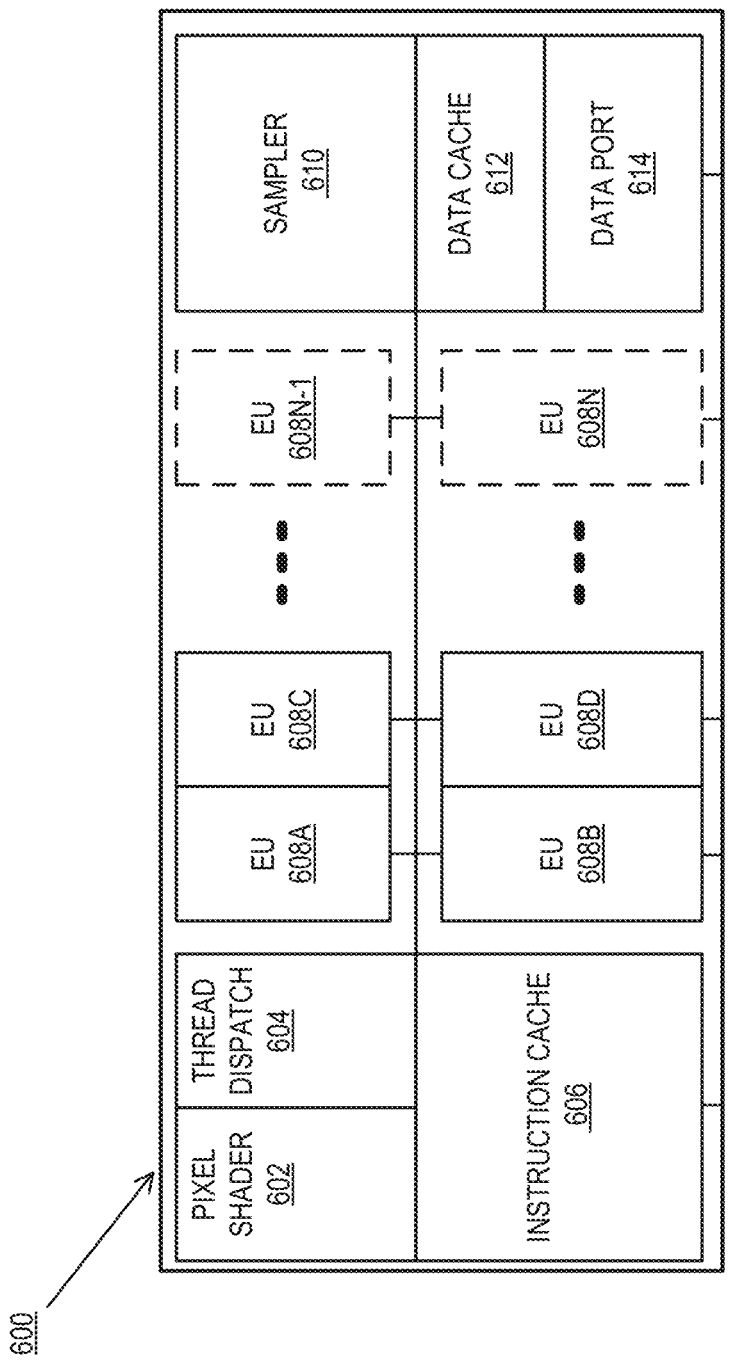
FIG. 6 is a block diagram of thread execution logic including an array of processing elements.

FIG. 6 illustrates thread execution logic 600 including an array of processing elements employed in some embodiments of a GPE. Elements of FIG. 6 having the same reference numbers (or names) as the elements of any other figure herein can operate or function in any manner similar to that described elsewhere herein, but are not limited to such.

In some embodiments, thread execution logic 600 includes a pixel shader 602, a thread dispatcher 604, instruction cache 606, a scalable execution unit array including a plurality of execution units 608A-608N, a sampler 610, a data cache 612, and a data port 614. In one embodiment the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution unit array 608A-608N. In some embodiments, each execution unit (e.g. 608A) is an individual vector processor capable of executing multiple simultaneous threads and processing multiple data elements in parallel for each thread. In some embodiments, execution unit array 608A-608N includes any number individual execution units.

In some embodiments, execution unit array 608A-608N is primarily used to execute "shader" programs. In some embodiments, the execution units in array 608A-608N execute an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders).

Each execution unit in execution unit array 608A-608N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-608N support integer and floating-point data types.

The execution unit instruction set includes single instruction multiple data (SIMD) instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In some embodiments, one or more data caches (e.g., 612) are included to cache thread data during thread execution. In some embodiments, sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. In some embodiments, thread execution logic 600 includes a local thread dispatcher 604 that arbitrates thread initiation requests from the graphics and media pipelines and instantiates the requested threads on one or more execution units 608A-608N. For example, the geometry pipeline (e.g., 536 of FIG. 5) dispatches vertex processing, tessellation, or geometry processing threads to thread execution logic 600 (FIG. 6). In some embodiments, thread dispatcher 604 can also process runtime thread spawning requests from the executing shader programs.

Once a group of geometric objects has been processed and rasterized into pixel data, pixel shader 602 is invoked to further compute output information and cause results to be written to output surfaces (e.g., color buffers, depth buffers, stencil buffers, etc.). In some embodiments, pixel shader 602 calculates the values of the various vertex attributes that are to be interpolated across the rasterized object. In some embodiments, pixel shader 602 then executes an application programming interface (API)-supplied pixel shader program. To execute the pixel shader program, pixel shader 602 dispatches threads to an execution unit (e.g., 608A) via thread dispatcher 604. In some embodiments, pixel shader 602 uses texture sampling logic in sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution logic 600 output processed data to memory for processing on a graphics processor output pipeline. In some embodiments, the data port 614 includes or couples to one or more cache memories (e.g., data cache 612) to cache data for memory access via the data port.

FIG. 7 is a block diagram illustrating a graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit format 710. A 64-bit compacted instruction format 730 is available for some instructions based on the selected instruction, instruction options, and number of operands. The native 128-bit format 710 provides access to all instruction options, while some options and operations are restricted in the 64-bit format 730. The native instructions available in the 64-bit format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For 128-bit instructions 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 722, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode information 726 specifying, for example, whether direct register addressing mode or indirect register addressing mode is used. When direct register addressing mode is used, the register address of one or more operands is directly provided by bits in the instruction 710.

In some embodiments, the 128-bit instruction format 710 includes an access/address mode field 726, which specifies an address mode and/or an access mode for the instruction. In one embodiment the access mode to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction 710 may use byte-aligned addressing for source and destination operands and when in a second mode, the instruction 710 may use 16-byte-aligned addressing for all source and destination operands.

In one embodiment, the address mode portion of the access/address mode field 726 determines whether the instruction is to use direct or indirect addressing. When direct register addressing mode is used bits in the instruction 710 directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Graphics Pipeline

Figure 8:
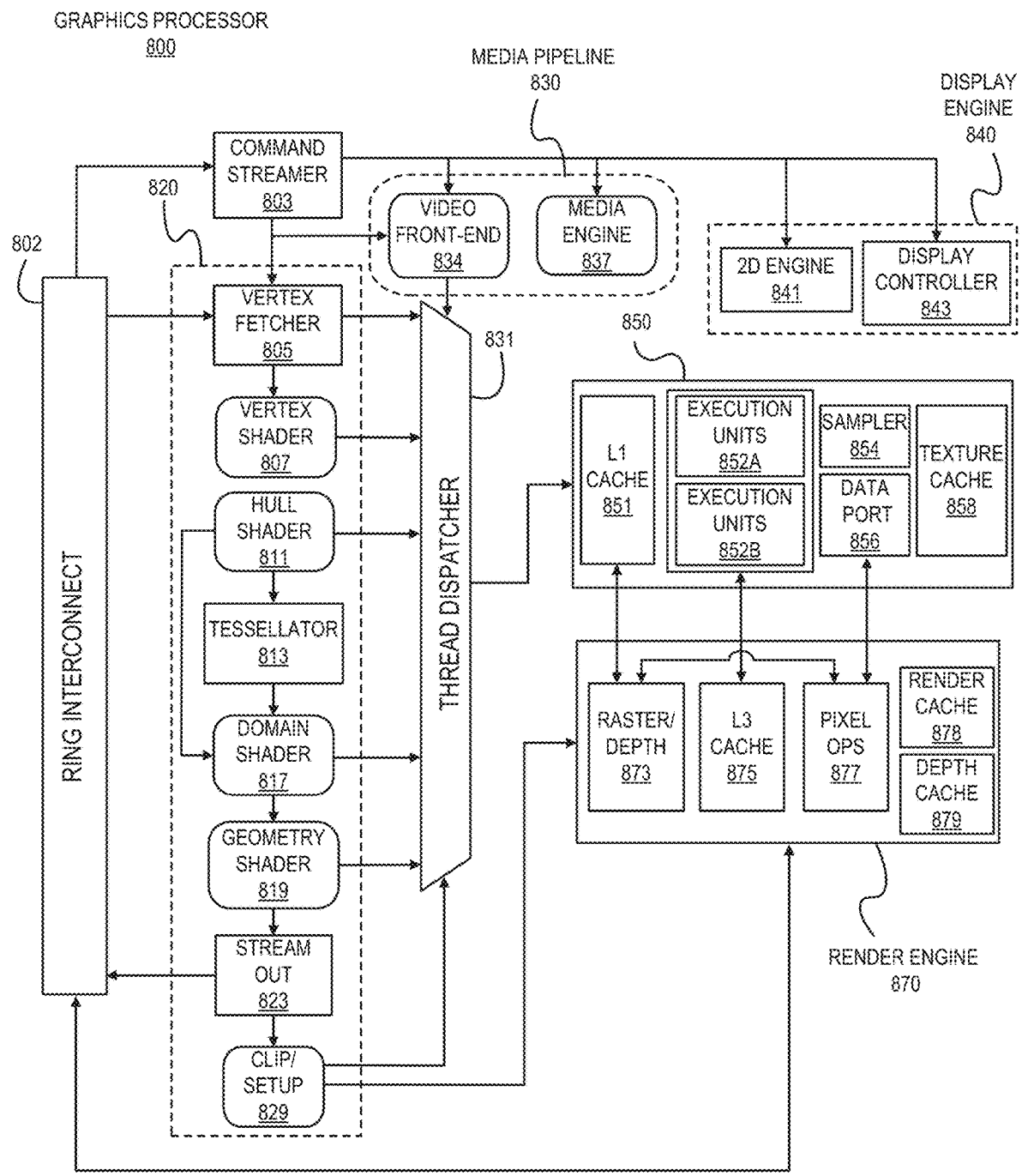
FIG. 8 is a block diagram of another embodiment of a graphics processor which includes a graphics pipeline, a media pipeline, a display engine, thread execution logic, and a render output pipeline.

FIG. 8 is a block diagram of another embodiment of a graphics processor 800. Elements of FIG. 8 having the same reference numbers (or names) as the elements of any other figure herein can operate or function in any manner similar to that described elsewhere herein, but are not limited to such.

In some embodiments, graphics processor 800 includes a graphics pipeline 820, a media pipeline 830, a display engine 840, thread execution logic 850, and a render output pipeline 870. In some embodiments, graphics processor 800 is a graphics processor within a multi-core processing system that includes one or more general purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of graphics pipeline 820 or media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A, 852B via a thread dispatcher 831.

In some embodiments, execution units 852A, 852B are an array of vector processors having an instruction set for performing graphics and media operations. In some embodiments, execution units 852A, 852B have an attached L1 cache 851 that is specific for each array or shared between the arrays. The cache can be configured as a data cache, an instruction cache, or a single cache that is partitioned to contain data and instructions in different partitions.

In some embodiments, graphics pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to graphics pipeline 820. In some embodiments, if tessellation is not used, tessellation components 811, 813, 817 can be bypassed.

In some embodiments, complete geometric objects can be processed by a geometry shader 819 via one or more threads dispatched to execution units 852A, 852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer and depth test component 873 in the render output pipeline 870 dispatches pixel shaders to convert the geometric objects into their per pixel representations. In some embodiments, pixel shader logic is included in thread execution logic 850. In some embodiments, an application can bypass the rasterizer 873 and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A, 852B and associated cache(s) 851, texture and media sampler 854, and texture/sampler cache 858 interconnect via a data port 856 to perform memory access and communicate with render output pipeline components of the processor. In some embodiments, sampler 854, caches 851, 858 and execution units 852A, 852B each have separate memory access paths.

In some embodiments, render output pipeline 870 contains a rasterizer and depth test component 873 that converts vertex-based objects into an associated pixel-based representation. In some embodiments, the rasterizer logic includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front end 834. In some embodiments, video front end 834 receives pipeline commands from the command streamer 803. In some embodiments, media pipeline 830 includes a separate command streamer. In some embodiments, video front-end 834 processes media commands before sending the command to the media engine 837. In some embodiments, media engine 337 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, graphics pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL) and Open Computing Language (OpenCL) from the Khronos Group, the Direct3D library from the Microsoft Corporation, or support may be provided to both OpenGL and D3D. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

FIG. 9A is a block diagram illustrating a graphics processor command format 900 according to some embodiments. FIG. 9B is a block diagram illustrating a graphics processor command sequence 910 according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a target client 902 of the command, a command operation code (opcode) 904, and the relevant data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word.

The flow diagram in FIG. 9B shows an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command is 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, return buffer state commands 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930, or the media pipeline 924 beginning at the media pipeline state 940.

The commands for the 3D pipeline state 930 include 3D state setting commands for vertex buffer state, vertex element state, constant color state, depth buffer state, and other state variables that are to be configured before 3D primitive commands are processed. The values of these commands are determined at least in part based the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of media pipeline state commands 940 are dispatched or placed into in a command queue before the media object commands 942. In some embodiments, media pipeline state commands 940 include data to configure the media pipeline elements that will be used to process the media objects. This includes data to configure the video decode and video encode logic within the media pipeline, such as encode or decode format. In some embodiments, media pipeline state commands 940 also support the use one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 10:
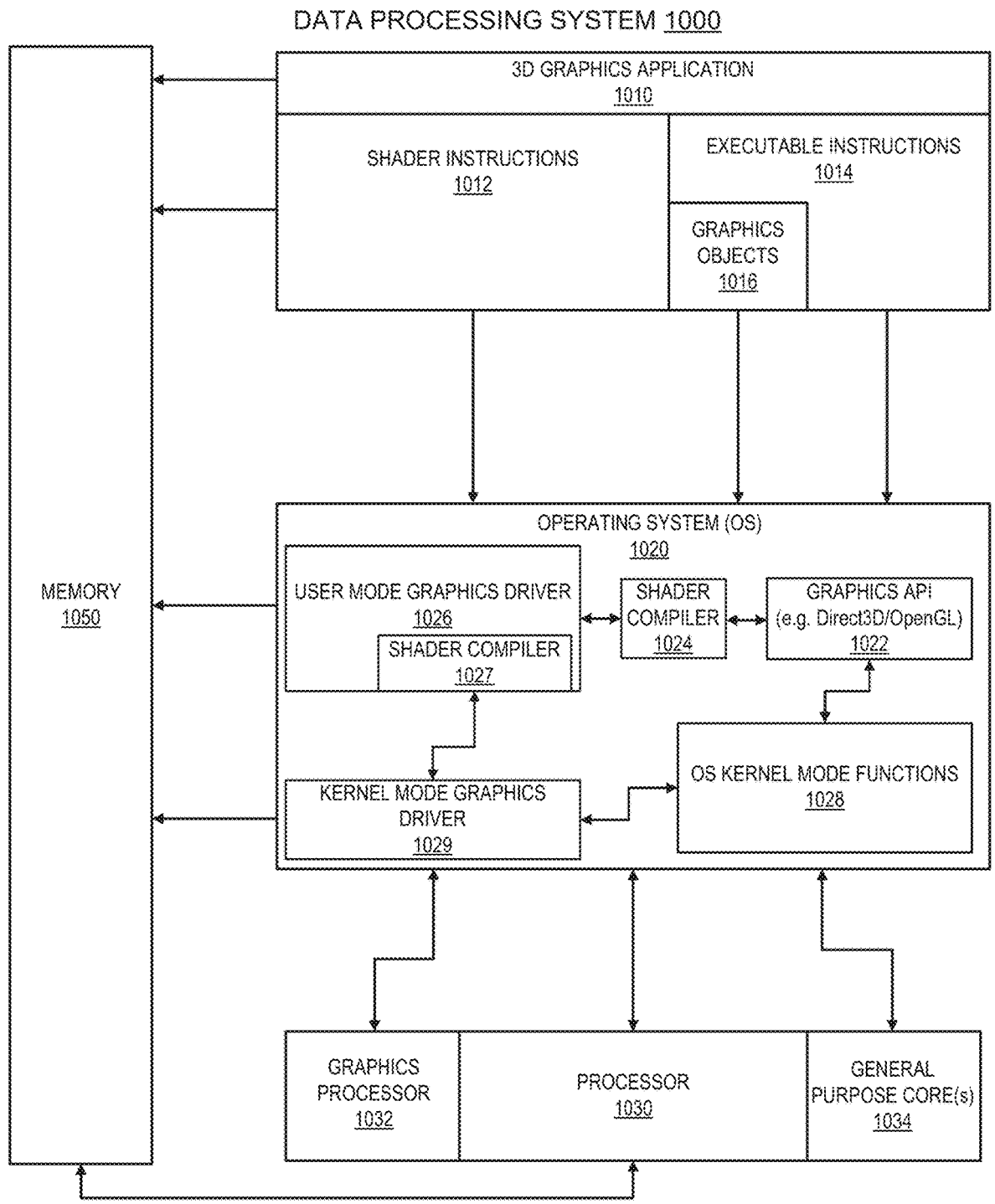
FIG. 10 illustrates exemplary graphics software architecture for a data processing system according to an embodiment.

FIG. 10 illustrates exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 11:
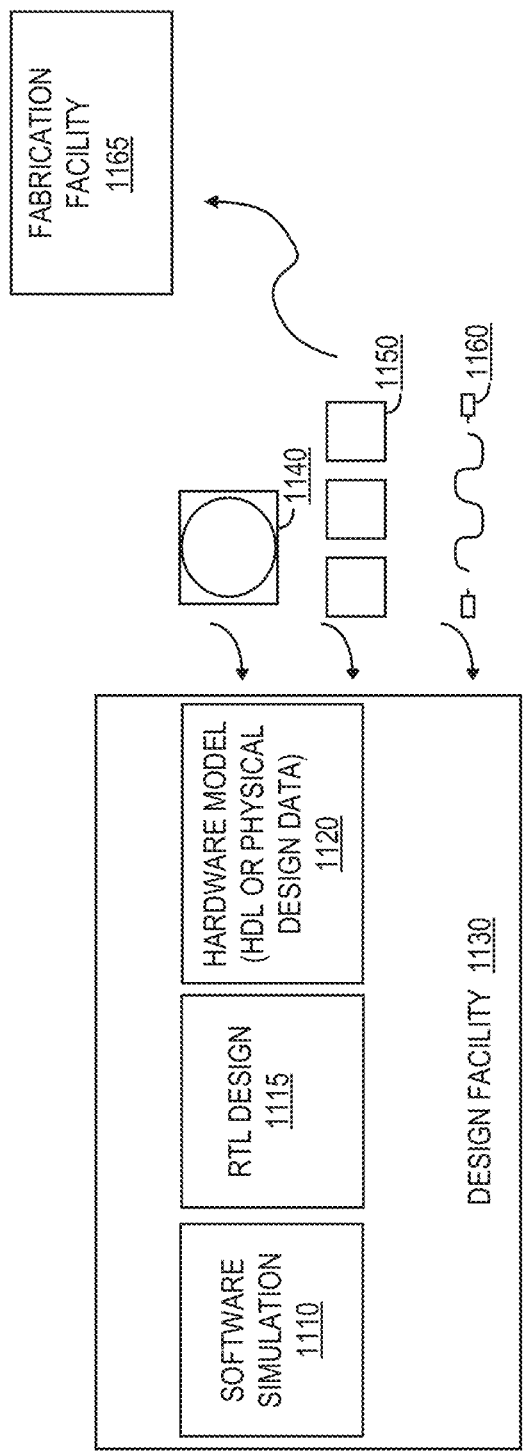
FIG. 11 illustrates an exemplary IP core development system that may be used to manufacture an integrated circuit to perform operations according to an embodiment.

FIG. 11 is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high level programming language (e.g., C/C++). The software simulation 1110 can be used to design, test, and verify the behavior of the IP core. A register transfer level (RTL) design can then be created or synthesized from the simulation model 1100. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a 3$^{rd}$ party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Figure 12:
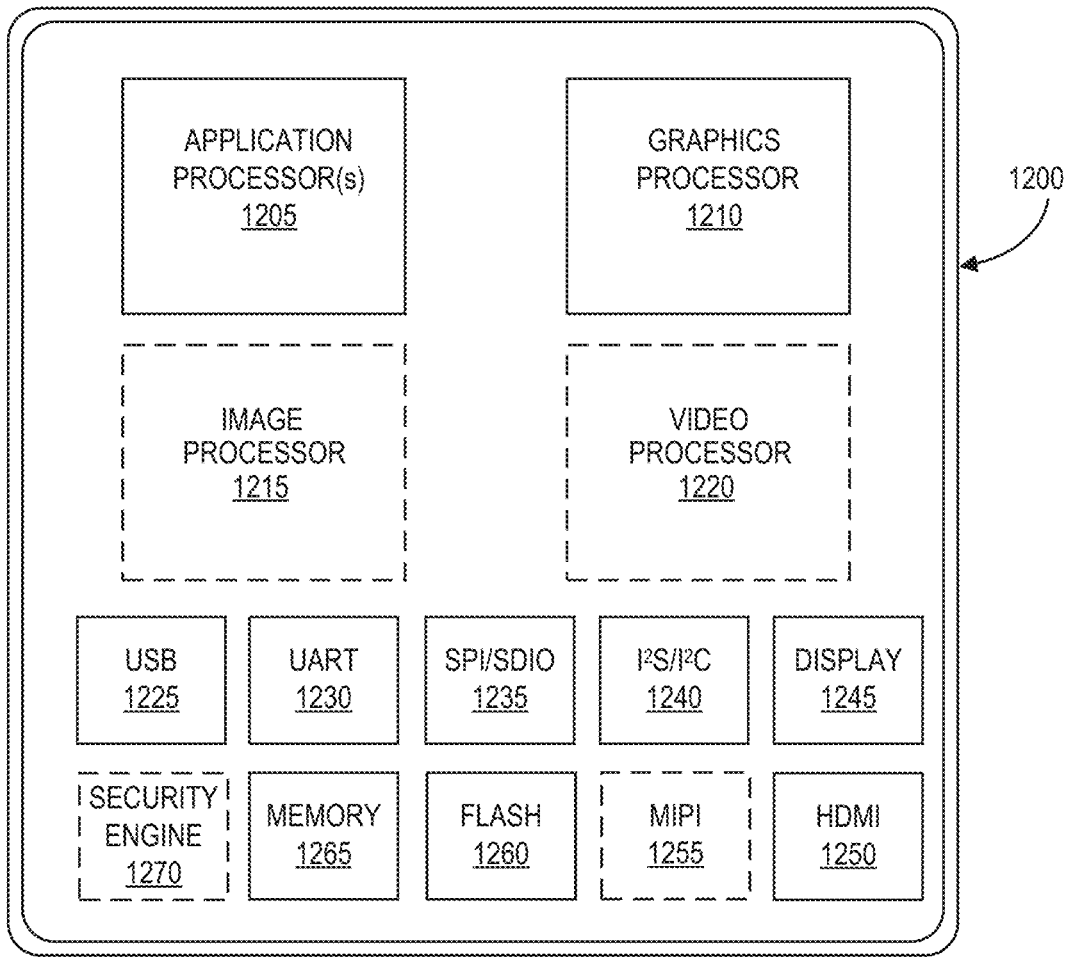
FIG. 12 illustrates an exemplary system on a chip integrated circuit that may be fabricated using one or more IP cores, according to an embodiment.

FIG. 12 is a block diagram illustrating an exemplary system on a chip integrated circuit 1200 that may be fabricated using one or more IP cores, according to an embodiment. The exemplary integrated circuit includes one or more application processors 1205 (e.g., CPUs), at least one graphics processor 1210, and may additionally include an image processor 1215 and/or a video processor 1220, any of which may be a modular IP core from the same or multiple different design facilities. The integrated circuit includes peripheral or bus logic including a USB controller 1225, UART controller 1230, an SPI/SDIO controller 1235, and an I²S/I²C controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

Additionally, other logic and circuits may be included in the processor of integrated circuit 1200, including additional graphics processors/cores, peripheral interlace controllers, or general purpose processor cores.

Apparatus and Method for Asynchronous Texel Shading

As mentioned, texel shading has been previously described with a 1-pass model where the texel shader runs synchronously—i.e., the issuing thread waits for the texel shader to finish and return a shaded result. This is a problem since modern GPUs are massively parallel (e.g., potentially running thousands of threads) and there is often a many-to-one mapping of pixel shader threads to texel shader threads, e.g., the texel shader is running at lower spatial frequency. To hide the latency of the texel shader, a large number of pixel shader threads have to be stalled, consuming valuable on-chip registers and/or buffer space, or alternatively triggering expensive spill/fill operations to swap out the thread contexts for stalled threads to memory.

One embodiment of the invention runs a texel shader asynchronously, using a 2-pass model, which is a natural execution model for streaming architectures like massively parallel GPUs. In this case, the issuing thread (e.g. pixel shader) submits a request to shade texels, but the thread does not wait for the texel shader thread to complete. This approach drastically reduces hardware scope by reducing the buffering requirements for latency hiding. Upon completion, the texel shader writes shaded texels to the procedural texture, which is stored in memory and accessed through the cache hierarchy. After an explicit synchronization point (e.g. per each draw call or at a coarser granularity), the procedural texture may be sampled (read only) and the results used.

The embodiments of the invention incorporate the implementation, execution model, use cases, and extensions for asynchronous texel shading. Note that the described asynchronous execution model does not preclude that this feature is exposed as synchronous texel shading (1-pass) at the application level (as described below). However, by explicitly exposing the asynchronous 2-pass model, new usage models are possible.

Figure 13:
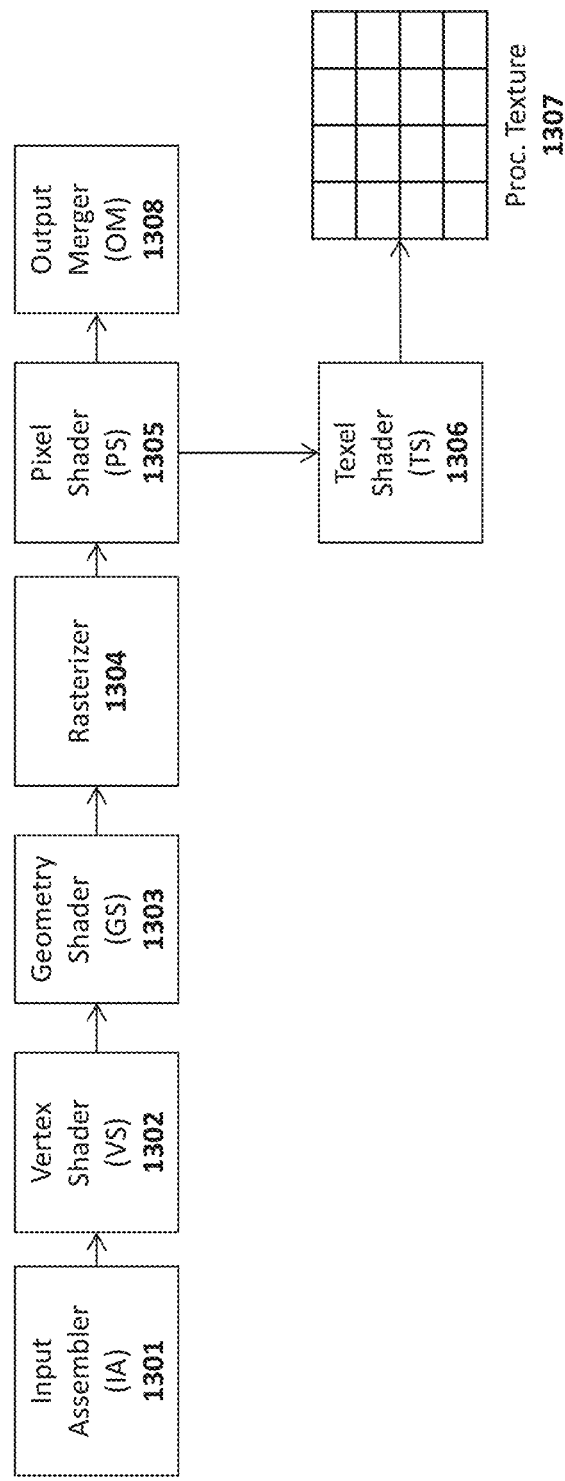
FIG. 13 illustrates a graphics pipeline supporting asynchronous texel shading.

FIG. 13 illustrates an example of a graphics pipeline that implements asynchronous texel shading in accordance with one embodiment. An input assembler (IA) 1301 reads index and vertex data and the vertex shader (VS) 1302 from memory. The vertex shader 1302 performs shading operations on each vertex (e.g., transforming each vertex's 3D position in virtual space to the 2D coordinate at which it appears on the screen) and generates results in the form of primitives (e.g., triangles). A geometry shader (GS) 1303 takes a whole primitive as input, possibly with adjacency information. For example, when operating on triangles, the three vertices are the geometry shader's input. The shader can then emit zero or more primitives, which are rasterized at a rasterization stage 1304 and their fragments ultimately passed to a pixel shader (PS) 1305.

In one embodiment, a shader thread, for example the pixel shader (PS) 1305, issues an "evaluate texels" shading request on a procedural texture 1307. Unlike a standard texture sample operation, the request does not return data, but has a side-effect of possibly spawning texel shaders (TS) 1306. The issuing thread can thus immediately continue its execution, passing shaded pixels to the output merger (OM) which performs operations such as alpha blending and writes the pixels back to the backbuffer. If there are texels in the shading request that have not already been shaded, those are immediately marked as "shaded" and one or more texel shader (TS) 1306 threads will be scheduled to evaluate their shading and write the results (e.g., colors) to memory (e.g., within procedural texture 1307). Hence, subsequent evaluate requests for the same texel(s) will not trigger re-shading. After an explicit synchronization point, the generated procedural texture 1307 may be used as a shader resource, i.e. its data can be requested by the texture sampler. Thus, in one embodiment, the texels computed by the TS 1306 may be consumed in a subsequent pass, where the procedural texture 1307 is used as a regular texture.

Figure 14:
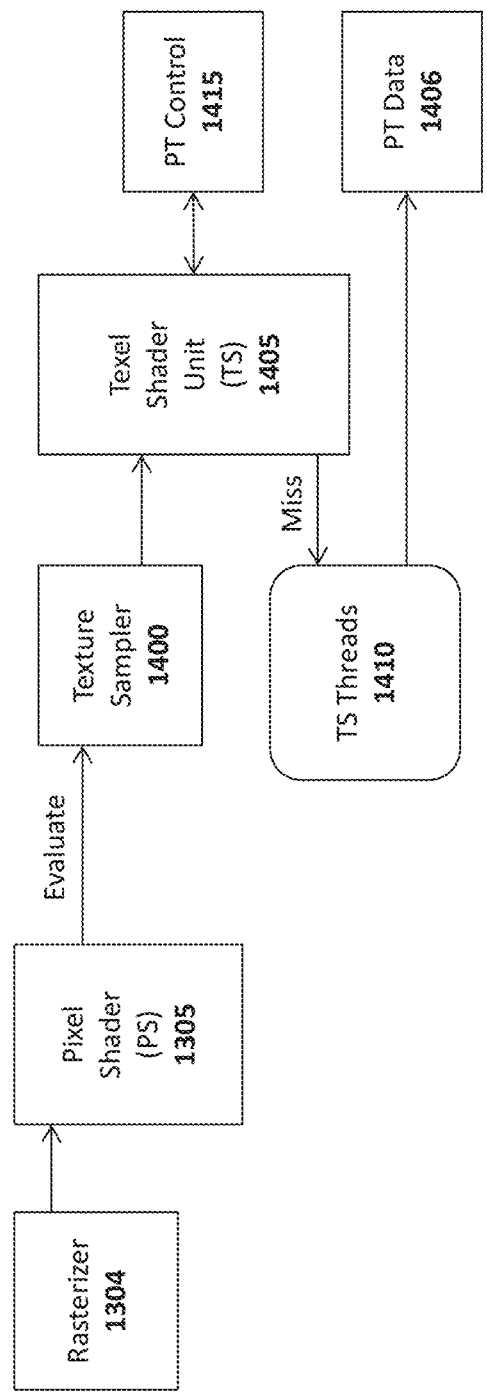
FIG. 14 illustrates an execution model in accordance with one embodiment of the invention.

One embodiment is described by the execution model in FIG. 14. In this example, the rasterizer 1304 triggers pixel shader (PS) 1305 threads, which perform "Evaluate" operations on the procedural texture. These requests are handled by the texture sampler 1400, which performs address computations to compute which texels need to be accessed. The address computations may involve, for example, level-of-detail (LOD) computations, mip level selection, applications of wrap modes, and other operations normally performed by the a texture sampler.

Following this, requests to access individual texels or blocks of texels (e.g., arranged as cache lines) are then sent to a fixed-function texel shader (TS) unit 1405, rather than to the texture cache as normally done. The TS unit 1405 queries the procedural texture (PT) control surface 1415 to detect which texels have been shaded. If there are unshaded texels, resulting in a "miss," texel shader threads 1410 are spawned which, upon completion, write their results directly to the procedural texture data 1406.

Different variations of this model may be implemented. In one embodiment, the texture sampler 1400 itself queries the control surface 1415, and only forwards shading requests for texels not previously shaded to the fixed-function texel shader unit. In another embodiment, the texture sampler 1400 does all operations itself, querying/updating the control surface 1415 and spawning texel shader threads 1410, without the need for a separate fixed-function TS unit 1405.

Figure 15:
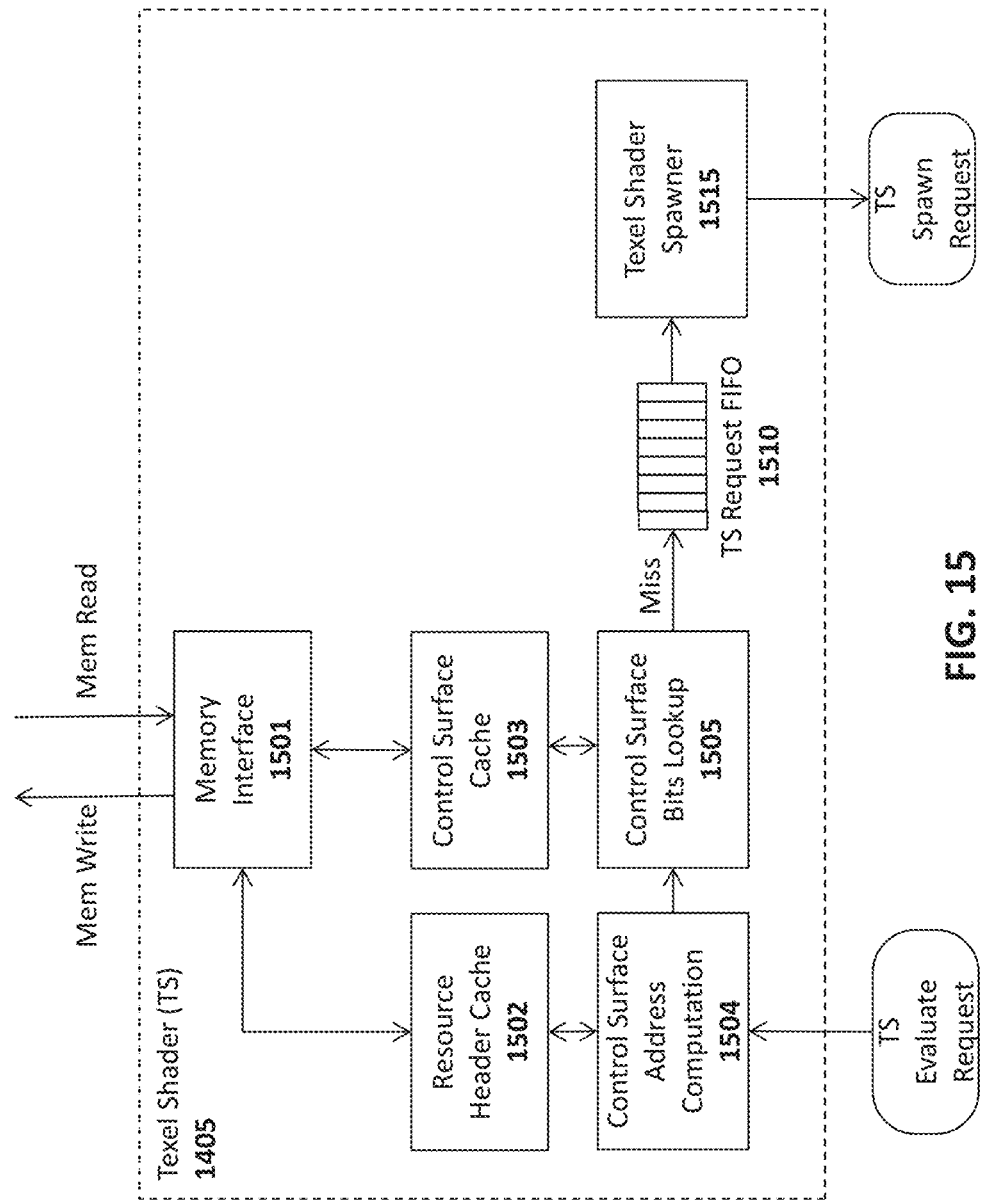
FIG. 15 illustrates a texel shader unit in accordance with one embodiment of the invention.

The operation of one embodiment of the TS unit 1405 will be described with respect to FIG. 15. As previously noted, in some embodiments some or all of these operations may be done in the texture sampler instead. In one embodiment, the input to the TS unit 1405 is a "TS evaluate request", whose parameters may include a resource identifier (ID), texel coordinate (uv), miplevel (lod), and array index (ai), and any auxiliary parameters. Control surface address computation 1504 within the TS unit 1405 first computes the address of the corresponding location in the control surface (PT control 1415). To do this, it accesses a resource header to query dimension, format, etc. of the procedural texture. In one embodiment, the resource headers are maintained in a dedicated resource header cache 1502 or in a shared cache which is backed up by system memory accessible via a memory interface 1501.

Based on the control surface address, the control surface bits associated with the shading location are queried by a control surface bit lookup circuit/logic 1505. These bits may be accessed via a control surface cache 1503 (dedicated or shared) which may also be backed up by the system memory. The control surface bits encode the state of a region of the data surface (e.g., one or more cache lines). For example, the bits may encode if the texel(s) in the region are shaded or cleared (not yet shaded). The bits may also, optionally encode whether the data is stored in a compressed format. Texels that are not cleared may be assigned a clear color in subsequent sampling operations.

If the texel(s) are not shaded, resulting in a "miss," the control surface is updated to indicate that the texel(s) are being shaded, and a texel shader spawn request is sent to a TS request FIFO queue 1510. Hence, subsequent requests for the same texel(s) will not trigger re-shading. If the request FIFO is too small to hold all concurrent requests for the worst-case scenario, an overflow handler may be used, which spills additional TS requests to memory and fetches them when there is room in the FIFO. TS requests in the request FIFO 1510 are consumed by a texel shader spawner

1515, which is responsible for scheduling a texel shader thread via other subsystems (not shown).

One embodiment of the invention includes an application programming interface (API) for evaluating and sampling a procedural texture. With asynchronous texel shading, the evaluation and sampling of a procedural texture can be expressed in APIs as two separate operations:

1. void Evaluate (params)—This operation spawns texel shaders to compute (shade) texels which have not already been shaded (if any).

2. data type Sample (params)—This operation performs a traditional texture sampling operation on the procedural texture.

One embodiment of the invention emulates synchronous texel shading (i.e., the 1-pass model mentioned above). In particular, this embodiment can be used to mimic a synchronous (1-pass) execution model at the application level, which may be accomplished in several different ways.

In one embodiment, the driver replays the draw call(s) twice. Each pixel shader is compiled in two versions, one that has the Evaluate call and one with a Sample operation on the procedural texture. The first time the geometry is rendered, the Evaluate version of the pixel shader is executed, and the second time, the Sample version.

In another embodiment, geometry is buffered on chip by the hardware, and the graphics processor replays the geometry twice, switching between Evaluate and Sample operations. In both cases, a synchronous "Evaluate and Sample" operation can be exposed at the application level. For example:

datatype EvaluateAndSample (params)—This operation triggers texel shading of missing texels, and performs a traditional texture sampling operation on the procedure I texture, returning the generated data.

In some embodiments, the texel shader 1405 can take as input one or more system-generated values which enumerate which texel of the procedural texture the shader is invoked for. This may be expressed in terms of the texel's normalized or unnormalized coordinates, mipmap level, and/or texture array slice.

The shader may declare one of these two inputs (or both):

1. TexelPositionInteger—For a 2D procedural texture this may be a 4-wide integer vector with components (u,v,ai,lod), where (u,v) are integer position of the shaded texel in array slice ai and mipmap level lod. For a 3D procedural texture (non-arrayed), the value may instead be (u,v,w,lod), where (u,v,w) are the integer texel positions, and lod is the mipmap level.

2. TexelPositionFloat—This may be similarly expressed as 4-wide floating point vector, where texel position is described as the normalized texture coordinates of the center of the texel, i.e., the each coordinate is in the range [0,1].

Based on the texel coordinate, the texel shader may then further lookup vertex attributes and perform attribute interpolation, in order to evaluate shading, as shown in the following pseudo-code example:

```
float4 MainTS(int4 P : SV_TexelPositionInteger)
{
    int triIdx = ComputeTriIdx(P)
    VS_OUT vtx[3] = FetchVertices(triIdx);
    float2 uv = ComputeBarys(vtx[0].pos, vtx[1].pos,
vtx[2].pos, P);
    VS_OUT attribs = Interpolate(vtx, uv);
    return Shade(attribs);
}
```

The output from the texel shader is typically a color, for example, expressed as a 4-wide floating point vector, which is converted into the procedural texture's native format upon storing the value.

In some embodiments, the output is a vector with one or more components, which may be integer or floating-point values. It is also possible to support an array of output values, out of which each element may be a floating-point or integer vector with 1 or more components. In one embodiment, the output is a user-defined data structure, which may contain any number of elements and data types.

The embodiments of the invention may be employed for a variety of use cases. For example, asynchronous texel shading can be integrated in a rendering application in many different ways. A few different cases are shown in the diagrams below.

Figure 16:
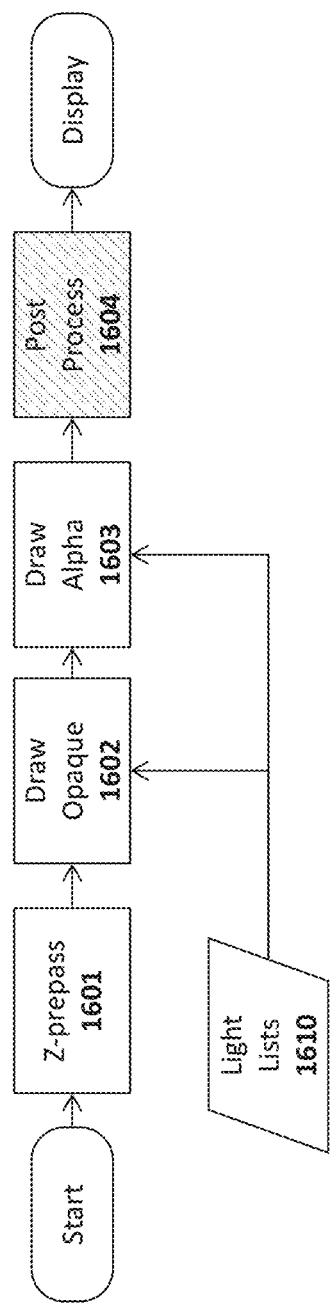
FIG. 16 illustrates an exemplary model of a forward (+) rendering pipeline.

One embodiment of the invention performs forward shading. FIG. 16 illustrates a model of typical Forward(+) renderer including a Z-prepass stage 1601 for processing depth values, a draw opaque stage 1602 for rendering visible (opaque) pixels, and a draw alpha stage 1603 for processing semi-transparent pixels and a post processing stage 1604. The renderer uses precomputed light lists 1610 (e.g., per tile) to accelerate the lighting computations in the pixel shaders 1602-1603. In the figure, patterned boxes are full screen passes, while clear boxes are traditional draw calls (rasterized geometry).

Figure 17:
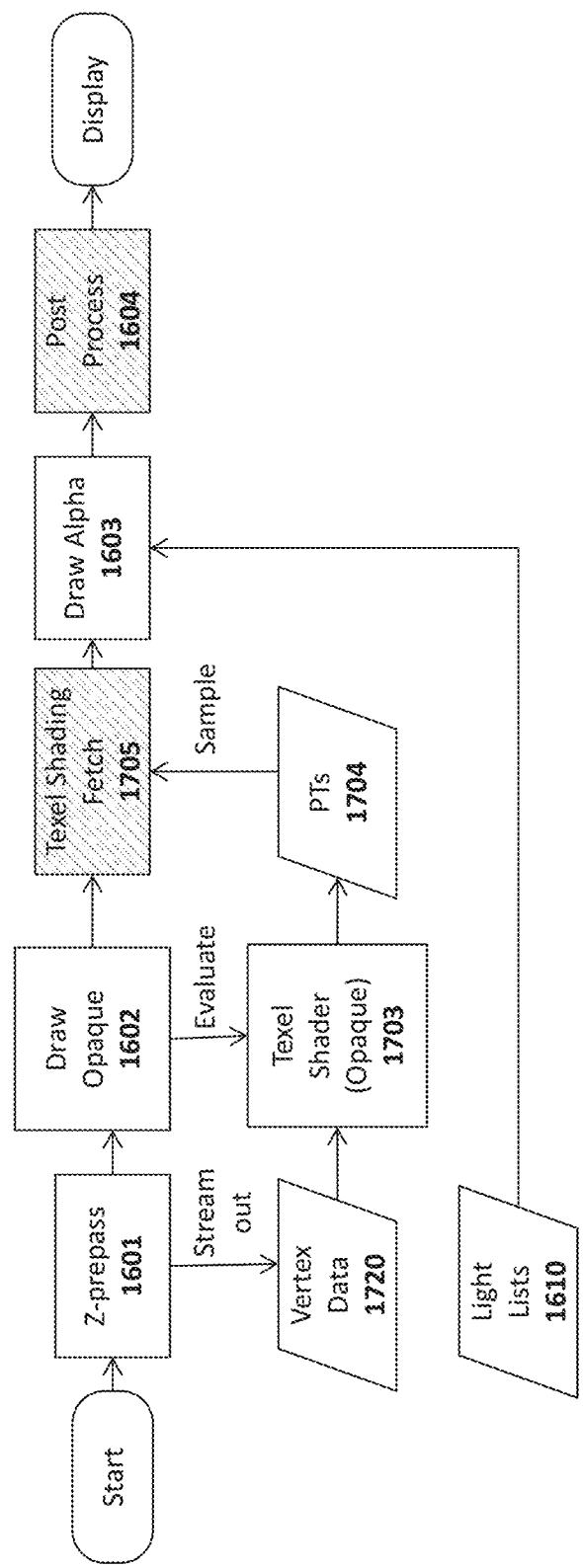
FIG. 17 illustrates an exemplary use case adapted to use asynchronous texel shading for the opaque (non-transparent) geometry.

FIG. 17 shows this use case adapted to use asynchronous texel shading for the opaque (non-transparent) geometry. In this case, the main opaque rendering pass 1602 performs Evaluate operations on procedural textures (PTs) to trigger shading of the relevant texels by texel shader 1703 which operates on vertex data 1720 provided from Z-prepass. The output of the texel shaders are written to a set of sparsely populated PTs 1704, which are sampled using sample operations from a subsequent fullscreen pass by texel shading fetch 1705. In order to know where to sample for each pixel on the screen, the forward rendering pass stores per-pixel PT index, texture (u,v) coordinates, mip level, and array slice (if used), similar to how a G-buffer is generated.

In some embodiments, the texel shader fetches vertex attributes from vertex buffers. To handle dynamically generated geometry (e.g. skinned meshes), vertex stream out may be used to store the post-vertex shading vertices to a temporary buffer, which is accessed by the texel shader. Vertex stream out may be done as part of a Z-prepass or in a separate rendering pass. In some embodiments, vertex buffers for dynamic geometry are created by compute shaders.

Figure 18:
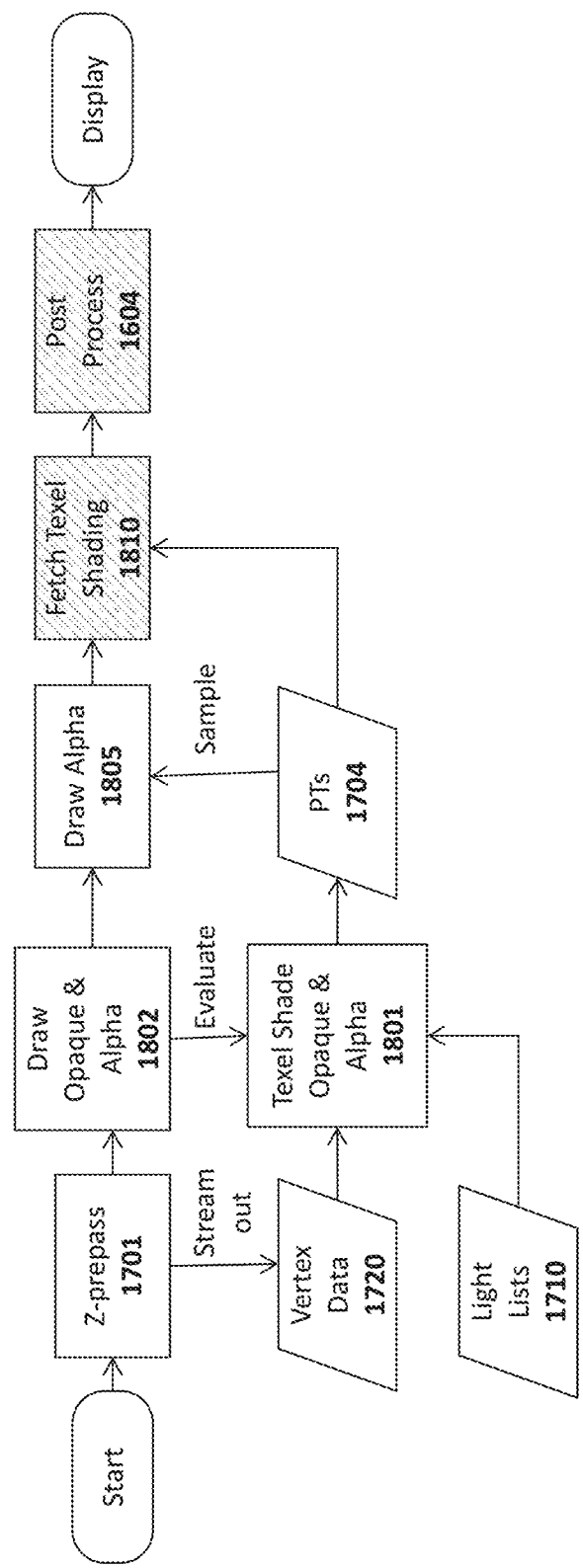
FIG. 18 illustrates an exemplary embodiment in which texel shading is used both for opaque and transparent (alpha) geometry.

In a further variation of this use case, illustrated in FIG. 18, texel shading is used both for opaque and transparent (alpha) geometry. This may be implemented as before by triggering texel shading 1801 from forward rendering of both opaque and alpha geometry 1802. Since transparent geometry has to be composited in a correct order, a second rendering pass of the alpha geometry 1805 is inserted, which simply fetches texel shading and blends/composites the color.

Furthermore, it is in some cases such as accumulative alpha blending, the blending equations may be configured to move the fullscreen pass 1810 to last. The benefit of this is that it can then be integrated into one of the existing fullscreen passes to further reduce cost (in the figure it's shown as a separate pass 1810).

Figure 19:
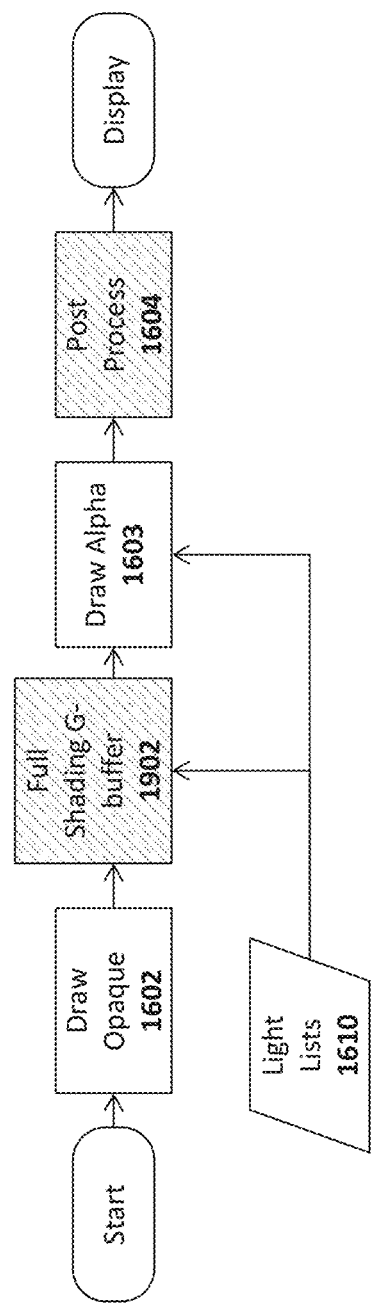
FIG. 19 illustrates a traditional deferred shading renderer.

FIG. 19 illustrates a traditional deferred shading renderer, where the most expensive lighting and shading computations take place in the G-buffer shading pass 1902.

Figure 20:
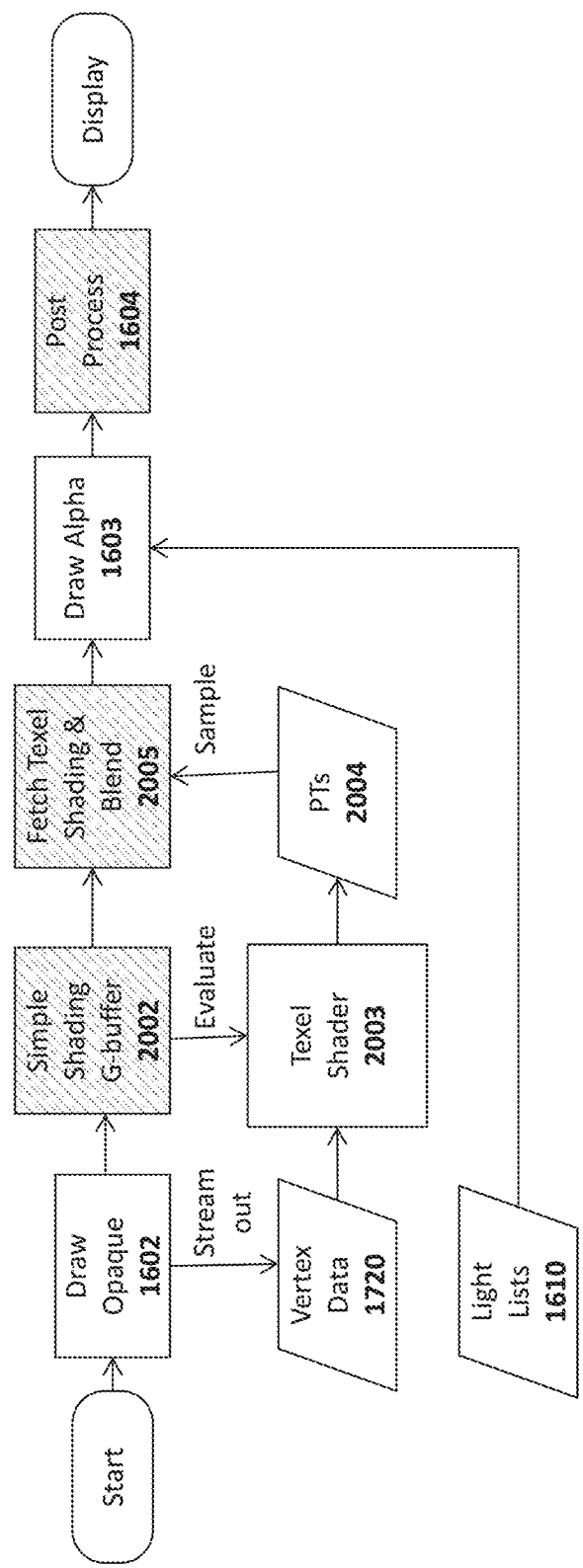
FIG. 20 illustrates one embodiment of the invention augmented with texel shading, which is triggered based on attributes in a G-buffer.

FIG. 20 illustrates this use case augmented with texel shading, which is now triggered based on attributes in the G-buffer 2002 (e.g. texture coordinates). In this case, only simple per-pixel computations are done in the G-buffer shading pass 2002, while the most expensive lighting computations have been moved to texel shaders 2003. As before, dynamic geometry may be handled by using stream out. After the G-buffer shading pass 2002, a fullscreen pass 2005 is used to fetch & blend shading from the procedural texture(s) 2004. In this example, transparent (alpha) geometry is rendered last at 1603 and blended onto the final frame. Other possibilities exist, e.g. drawing alpha earlier and letting it blend into the G-buffer, and/or applying texel shading also to alpha geometry.

Figure 21:
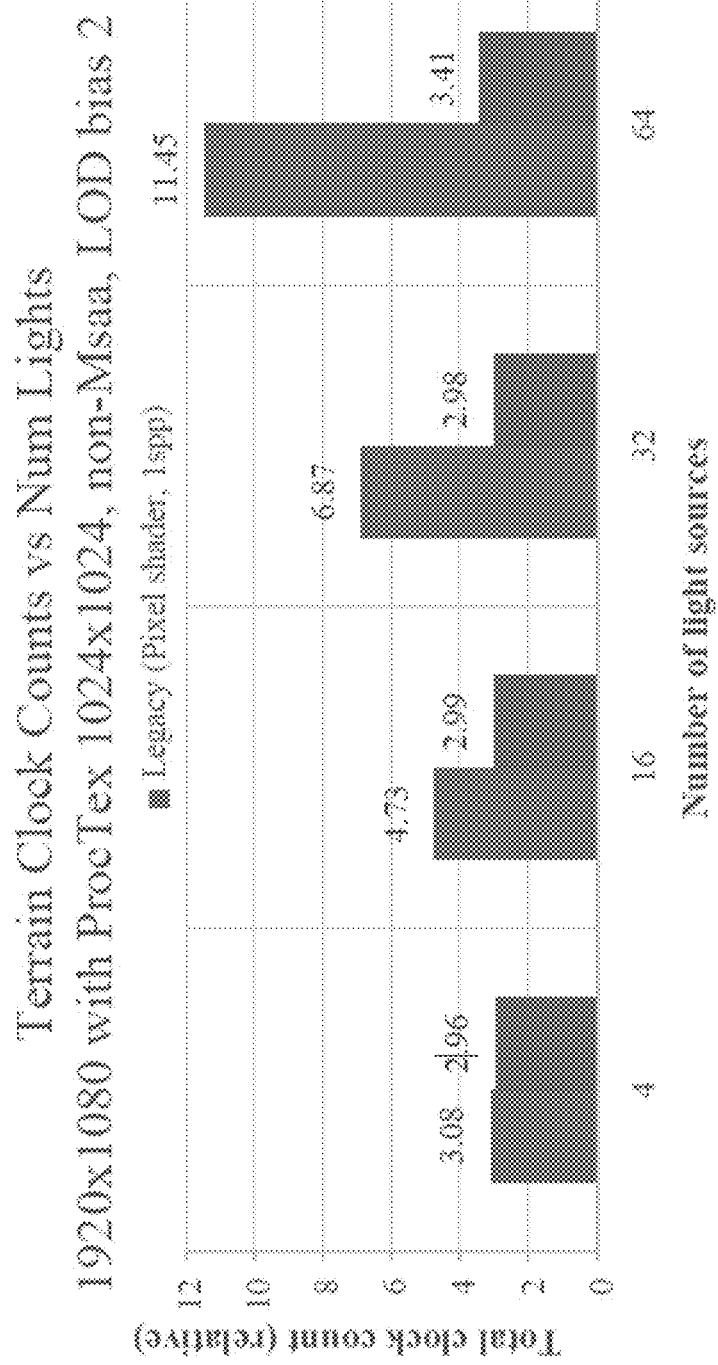
FIG. 21 illustrates exemplary performance measurements for a simple workload in accordance with one embodiment of the invention.

FIG. 21 illustrates performance measurements for a simple workload using Forward rendering. In the example, lighting calculations have been moved from the pixel shader to a texel shader. The algorithm has two passes.

The 1st pass calls Evaluate( . . . ) and stores its parameters (u,v,lod) to a G-buffer.

The 2nd pass (fullscreen) fetches parameters from the G-buffer and calls Sample( . . . ) using identical parameters. In the second pass, additional post-processing is also done (e.g. tonemapping). It should be noted that this is just one example. In addition, there is room for additional performance improvements by analyzing the bottlenecks. The blue bars indicate relative clock counts for traditional forward pixel shading, while red bars are the relative clock counts for forward rendering where lighting calculations has been moved to a texel shader. The x-axis shows varying numbers of light sources (i.e., complexity of the lighting calculations). At small numbers, the rendering is not pixel shader bound and there is little benefit of running a texel shader.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.).

In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A graphics processing apparatus comprising:
   a memory subsystem to store a procedural texture; and
   an execution circuit to perform pixel shading operations on a plurality of pixels in a first graphics processing pass and to submit a request to shade texels associated with the plurality of pixels, and
   the execution circuit further to responsively perform texel shading operations in response to the request, the texel shading operations to write results to the procedural texture stored in the memory subsystem, the procedural texture to be read during a second graphics processing pass,
   wherein the pixel shading operations on the plurality of pixels proceed without waiting for completion of the texel shading request.

2. The graphics processing apparatus as in claim 1 wherein the first graphics processing pass comprises graphics processing of a first portion of a first image frame and the second graphics processing pass comprises graphics processing of the first portion of a second image frame.

3. The graphics processing apparatus as in claim 1 wherein a request to shade texels is first processed by a texture sampler; and
   in response to the request to shade texels, the texture sampler is to perform address computations to determine the plurality of texels and submits the request to shade the texels.

4. The graphics processing apparatus as in claim 3 wherein the texture sampler is to initially query the procedural texture to determine whether relevant texels have already been shaded, prior to submitting the request to shade the texels.

5. The graphics processing apparatus as in claim 1 wherein an initial query is performed on the procedural texture to determine whether relevant texels have already been shaded prior to performing the texel shading operations.

6. The graphics processing apparatus as in claim 5 wherein the texel shading operations comprises:
   computing an address of a shading location in a control surface of the procedural texture; and
   querying the procedural texture to identify control surface bits associated with the shading location.

7. The graphics processing apparatus as in claim 6 wherein if the control surface bits indicate that the texels associated therewith are not shaded, the control surface is updated to indicate that the texels are being shaded, and a texel shader spawn request is generated.

8. The graphics processing apparatus as in claim 7 wherein the texel shader spawn request is queued in a request first in first out (FIFO) queue, and wherein a texel shader spawner is to process the texel shader spawn requests from the FIFO queue by scheduling one or more texel shader threads.

9. A method comprising:
performing pixel shading operations on a plurality of pixels in a first graphics processing pass;
submitting a request to shade texels associated with the plurality of pixels;
responsively performing texel shading operations in response to the request; and
writing results to a procedural texture stored in a memory subsystem, the procedural texture to be read during a second graphics processing pass,
wherein the pixel shading operations on the plurality of pixels proceed without waiting for completion of the texel shading request.

10. The method as in claim 9 wherein the first graphics processing pass comprises graphics processing of a first portion of a first image frame and the second graphics processing pass comprises graphics processing of the first portion of a second image frame.

11. The method as in claim 9 further comprising:
initially querying the procedural texture to determine whether relevant texels have already been shaded prior to performing the texel shading operations.

12. The method as in claim 11 wherein performing the texel shading operations further comprises:
computing an address of a shading location in a control surface of the procedural texture; and
querying the procedural texture to identify control surface bits associated with the shading location.

13. The method as in claim 12 wherein if the control surface bits indicate that the texels associated therewith are not shaded, the control surface is updated to indicate that the texels are being shaded, and a texel shader spawn request is generated.

14. The method as in claim 13 wherein the texel shader spawn request is queued in a request first in first out (FIFO) queue, the method further comprising:
processing the texel shader spawn requests from the FIFO queue by scheduling one or more texel shader threads.

15. A system comprising:
a plurality of cores;
a memory to store instructions and data;
a processor to execute the instructions and process the data;
a graphics processor to perform graphics operations in response to graphics instructions;
a network interface to receive and transmit data over a network;
an interface for receiving user input from a mouse or cursor control device, the plurality of cores executing the instructions and processing the data responsive to the user input;
the graphics processor comprising:
a memory subsystem to store a procedural texture; and
an execution circuit to perform pixel shading operations on a plurality of pixels in a first graphics processing pass and to submit a request to shade texels associated with the plurality of pixels, and
the execution is further to responsively perform texel shading operations in response to the request, the texel shading operations to write results to the procedural texture stored in the memory subsystem, the procedural texture to be read during a second graphics processing pass,
wherein the pixel shading operations on the plurality of pixels proceed without waiting for completion of the texel shading request.

16. The system as in claim 15 wherein the first graphics processing pass comprises graphics processing of a first portion of a first image frame and the second graphics processing pass comprises graphics processing of the first portion of a second image frame.

17. The system as in claim 15 wherein a request to shade texels is first processed by a texture sampler; and
in response to the request to shade texels, the texture sampler is to perform address computations to determine the plurality of texels and submits the request to shade the texels.

18. The system as in claim 17 wherein the texture sampler is to initially query the procedural texture to determine whether relevant texels have already been shaded, prior to submitting the requests to shade the texels.

19. The system as in claim 15 wherein the initial query is performed on the procedural texture to determine whether relevant texels have already been shaded prior to performing the texel shading operations.

* * * * *